United States Patent
Hu et al.

(10) Patent No.: US 11,861,805 B2
(45) Date of Patent: Jan. 2, 2024

(54) EYEBALL POSITIONING FOR 3D HEAD MODELING

(71) Applicant: SONY GROUP CORPORATION, Tokyo (JP)

(72) Inventors: Jie Hu, San Jose, CA (US); Mohammad Gharavi-Alkhansari, San Jose, CA (US)

(73) Assignee: SONY GROUP CORPORATION, Tokyo (JP)

(*) Notice: Subject to any disclaimer, the term of this patent is extended or adjusted under 35 U.S.C. 154(b) by 107 days.

(21) Appl. No.: 17/481,846

(22) Filed: Sep. 22, 2021

(65) Prior Publication Data
US 2023/0101230 A1  Mar. 30, 2023

(51) Int. Cl.
G06T 19/20 (2011.01)
G06T 17/00 (2006.01)

(52) U.S. Cl.
CPC .............. G06T 19/20 (2013.01); G06T 17/00 (2013.01)

(58) Field of Classification Search
None
See application file for complete search history.

(56) References Cited

U.S. PATENT DOCUMENTS

| | | | |
|---|---|---|---|
| 10,296,792 B2 | 5/2019 | Spizhevoy et al. | |
| 2007/0036397 A1* | 2/2007 | Hamza | G06V 40/18 382/117 |
| 2007/0116338 A1* | 5/2007 | Fidrich | A61B 6/506 382/128 |
| 2009/0303441 A1* | 12/2009 | Lieberman | A61B 3/0025 351/246 |
| 2011/0069277 A1* | 3/2011 | Blixt | G01S 17/46 349/61 |
| 2016/0027200 A1* | 1/2016 | Corazza | G06T 15/04 345/420 |
| 2016/0142673 A1* | 5/2016 | Rao | G06V 40/19 348/14.08 |
| 2016/0143524 A1* | 5/2016 | Bérard | A61B 3/103 351/246 |
| 2017/0024907 A1* | 1/2017 | Bermano | G06T 17/20 |
| 2017/0053166 A1* | 2/2017 | Amayeh | G06V 40/193 |
| 2018/0018515 A1* | 1/2018 | Spizhevoy | G06V 40/193 |
| 2018/0033190 A1* | 2/2018 | Ma | G06T 13/40 |
| 2019/0243448 A1 | 8/2019 | Miller et al. | |
| 2021/0358212 A1* | 11/2021 | Vesdapunt | G06T 17/20 |

FOREIGN PATENT DOCUMENTS

WO  2020/244971 A1  12/2020

* cited by examiner

*Primary Examiner* — Kent W Chang
*Assistant Examiner* — Jonathan M Cofino
(74) *Attorney, Agent, or Firm* — CHIP LAW GROUP

(57) ABSTRACT

An electronic device and method for positioning an eyeball into a 3D mesh of a head portion of an object is provided. Images of an eye of an object, the 3D mesh of the head portion of the object, and a 3D template mesh of an eyeball are acquired. 3D feature points for eye regions are extracted from the images and fit to a sphere. An initial pose transformation between the 3D template mesh and the sphere is estimated. Based on the 3D template mesh, a first set of points corresponding to the eye regions are interpolated. Based on sampling parameters for the first set of points, a second set of points are determined. A final pose transformation is determined based on minimization of difference between the first and the second set of points and the 3D template mesh is fit into an eyeball socket of the 3D mesh.

19 Claims, 16 Drawing Sheets

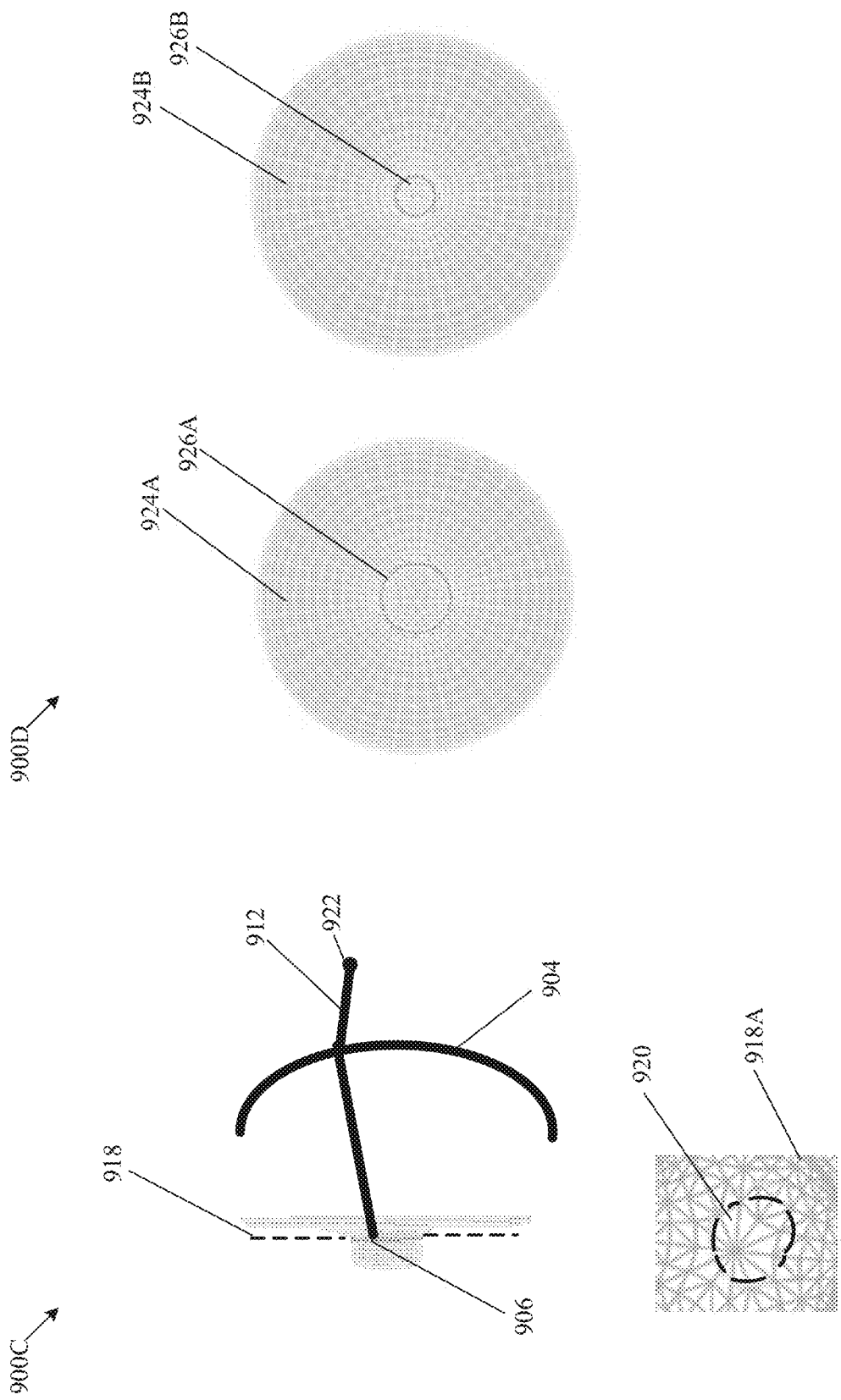

EYEBALL POSITIONING FOR 3D HEAD MODELING

CROSS-REFERENCE TO RELATED APPLICATIONS/INCORPORATION BY REFERENCE

None

FIELD

Various embodiments of the disclosure relate to three-dimensional (3D) modeling, computer graphics, and virtual human technology. More specifically, various embodiments of the disclosure relate to an electronic device and method for eyeball positioning for 3D head modeling.

BACKGROUND

Advancements in the field of three-dimensional (3D) computer graphics have provided the ability to create 3D models and visualize real objects in a 3D computer graphics environment. 3D content, such as a 3D character model, is increasingly used in animated movies, games, and virtual-reality systems to enhance user experience. A 3D model is a static 3D mesh that resembles the shape of a particular object. Typically, such a 3D model is manually designed by computer graphics artists, commonly known as modelers, by use of a modeling software application. Creating a realistic model that represents the 3D shape of the object has been a difficult problem in field of computer graphics and computer vision. With increasing applications in areas of virtual reality, 3D human avatar, 3D gaming, and virtual simulation, generating an accurate 3D mesh and imparting photorealism to a 3D model has become increasingly important. 3D Models which may be recovered from images or videos using 3D reconstruction methods, such as photogrammetry or a method that relies on monocular cues are prone to errors and artifacts in several regions, especially around the regions of eye. Without any post-processing operation, such 3D models may be unsuitable for applications which require high-fidelity/high quality renders. Traditionally, the 3D mesh may be manually refined. However, manual refinement of the 3D mesh may require significant amount of time and effort and may be prone to errors.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for eyeball positioning for three-dimensional (3D) head modeling is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 9A is a diagram that illustrates an exemplary image of an eye including a pupil, in accordance with an embodiment of the disclosure.

FIGS. 9B and 9C are diagrams that illustrate interpolation of a first set of points corresponding to the iris of an eye, in accordance with an embodiment of the disclosure.

FIG. 9D is a diagram that illustrates update of positions of labeled one or more points corresponding to a pupil of an eye in an iris mesh component of a 3D template mesh of the eye, in accordance with an embodiment of the disclosure.

DETAILED DESCRIPTION

Figure 1:
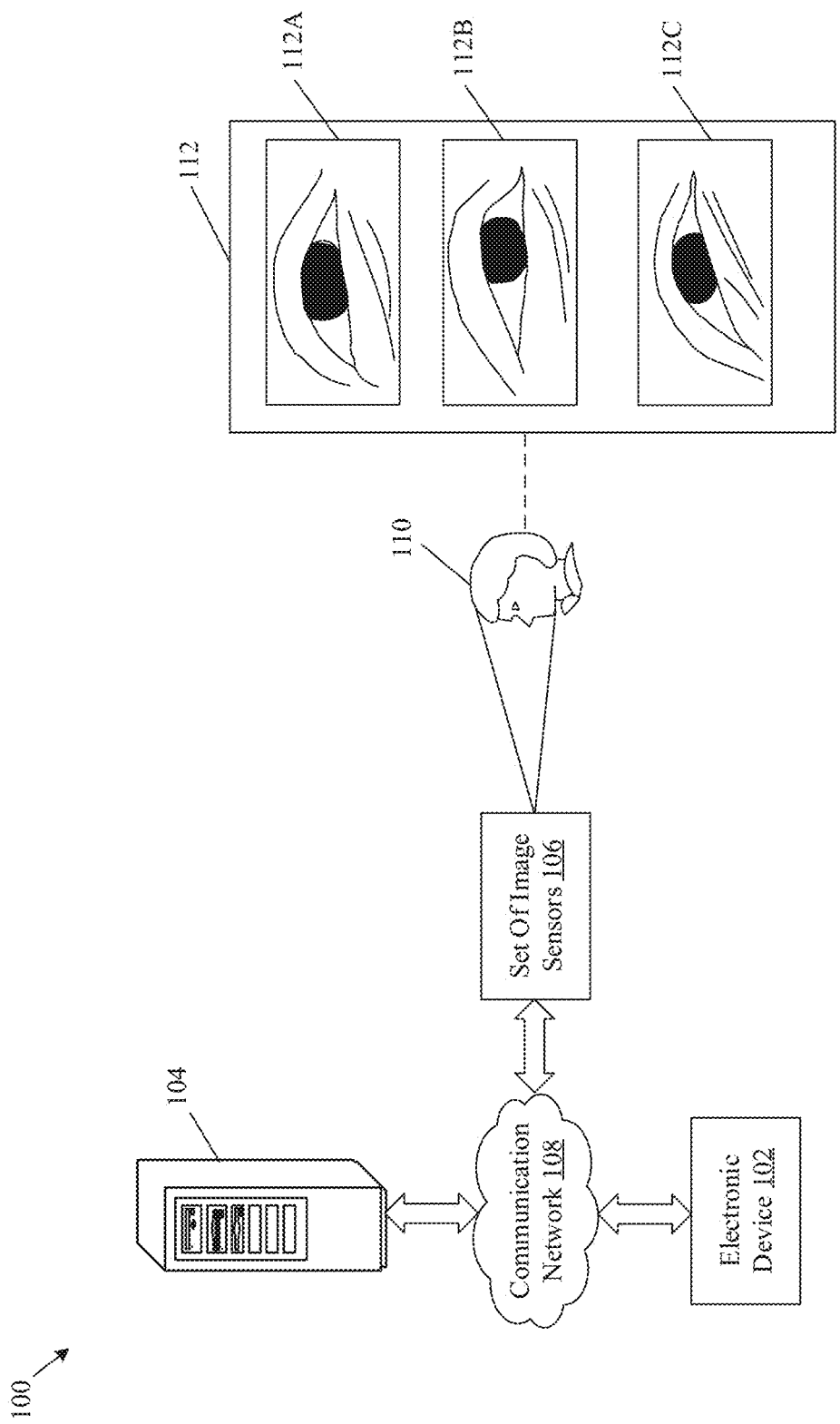
FIG. 1 is a block diagram that illustrates an exemplary network environment for eyeball positioning for three-dimensional (3D) head modeling, in accordance with an embodiment of the disclosure.

The following described implementations may be found in the disclosed electronic device and method of eyeball positioning for three-dimensional (3D) head modeling. Exemplary aspects of the disclosure may include an electronic device and a method to acquire a set of images, which include an eye of an object. For example, the electronic device may be associated with a set of image sensors, which may be controlled to capture a set of images of the object from a corresponding set of viewpoints. The object may be, for example, an animate object (such as a human or an animal) or an inanimate object (such as a 3D figure of a person or a toy with human-like features). A 3D mesh of a head portion of the object may be acquired. For example, the acquisition of the 3D mesh may be based on an extraction of the 3D mesh from a server or a database communicatively coupled to the electronic device. Prior to the acquisition of the 3D mesh, the 3D mesh may be estimated based on a plurality of images of the object. The plurality of images of the object may include at least the set of images which include the eye of the object. Additionally, a 3D template mesh of an eyeball may be acquired. For example, the acquisition of the 3D template mesh may be based on an extraction of the 3D template mesh from the server or a database communicatively coupled to the electronic device.

The acquired set of images may be processed to extract 3D feature points associated with one or more regions of the eye. Examples of the one or more regions of the eye may include, but are not limited to, eyelids, a limbus, a sclera, a pupil, and an iris. Thereafter, a sphere may be fit to the extracted 3D feature points. Further, an initial pose transformation between the 3D template mesh and the fitted sphere may be estimated. Moreover, one or more operations may be executed by using the 3D template mesh, to interpolate a first set of points that correspond to the one or more regions of the eye. Thereafter, a second set of points, which corresponds to the one or more regions of the eye, may be determined based on sampling parameters associated with the interpolated first set of points. A final pose transformation may be determined based on a minimization of a difference between the first set of points and the second set of points. Further, the 3D template mesh may be fit into an eyeball socket of the 3D mesh, based on the determined final pose transformation.

Typically, a 3D mesh of a head portion of an object may not have separate structures for an eyeball in the head portion of the object. Further, the quality of the 3D mesh for a region of the eyeball may be low due to a high specular reflection of the surface of the eyeballs and an occlusion caused by eyelashes. To impart realism to the 3D model of the object, the 3D mesh corresponding to the 3D model may have to be refined. In conventional methods, a 3D head mesh (represents a 3D shape/geometry of the head portion) may be manually refined to accurately represent and position the eyeball in the 3D mesh. A computer graphics artist, designer, modeler, or an expert (hereinafter referred as a human modeler) may refine the 3D mesh by a manual selection of vertices of the 3D mesh and an update of locations of the selected vertices in the 3D mesh to position the eyeball in the 3D mesh. However, manual refinement of the 3D mesh may require significant amount of time and effort and may be prone to errors. In contrast, the present disclosure may provide a new method for automated eyeball positioning in the 3D mesh of the head portion of the object. In the present disclosure, the 3D template mesh, which may be an eyeball mesh, may be used for determination of a final pose transformation of the eyeball. The 3D template mesh of the eyeball may be scaled to fit into the eyeball socket of the 3D mesh, and thus may be realistically sized for the 3D mesh. This may result in a higher accuracy eyeball positioning with improved quality of the eyeball region from the 3D template mesh as compared with that from the conventional methods. As the eyeball may be positioned automatically, manual effort and time may be saved, as compared to conventional methods.

FIG. 1 is a block diagram that illustrates an exemplary network environment for eyeball positioning for three-dimensional (3D) head modeling, in accordance with an embodiment of the disclosure. With reference to FIG. 1, there is shown a network environment 100. The network environment 100 may include an electronic device 102, a server 104, a set of image sensors 106, and a communication network 108. For example, the set of image sensors 106 may include a first image sensor 106A and a second image sensor 106B. In FIG. 1, there is further shown an object 110 that may be scanned by the set of image sensors 106. The electronic device 102 may be communicatively coupled to the server 104 and the set of image sensors 106, via the communication network 108.

In FIG. 1, the server 104 and the set of image sensors 106 are shown as two entities which may be separate from the electronic device 102. In some embodiments, some or all of the functionalities of the server 104 and/or the set of image sensors 106 may be incorporated in the electronic device 102, without a deviation from the scope of the present disclosure.

The electronic device 102 may include suitable logic, circuitry, interfaces, and/or code that may be configured to position an eyeball of the object 110 in a 3D mesh of a head portion of the object 110. The 3D mesh may represent a 3D shape of the head portion of the object 110. The object 110 may be an animate object (such as a human subject or an animal) or an inanimate object (such as a statue or a portrait of a human subject). Examples of the electronic device 102 may include, but are not limited to, a computing device, a video-conferencing system, a virtual reality-based device, an augmented reality-based device, a gaming device, a mainframe machine, a server, a computer work-station, and/or a consumer electronic (CE) device.

The server 104 may include suitable circuitry, interfaces, and/or code that may be configured to store a 3D template mesh of an object, such as the object 110. The 3D template mesh may be an eyeball mesh that resembles the shape and other visual attributes of a real-life eyeball. The eyeball mesh may include an anterior (front) segment and a posterior (back) segment. The anterior segment may be made up of cornea, iris, and lens. The server 104 may be configured to receive a request for the stored 3D template mesh from the electronic device 102. In response to such a request from the electronic device 102, the server 104 may transmit the stored 3D template mesh to the electronic device 102. Examples of the server 104 may include, but are not limited to, an application server, a cloud server, a web server, a database server, a file server, a gaming server, a mainframe server, or a combination thereof.

The set of image sensors 106 may include suitable logic, circuitry, interfaces, and/or code that may be configured to capture a set of images of the object 110 from a set of viewpoints. For example, the set of image sensors 106 may include a first image sensor that may capture one or more first images of the object 110 (e.g., a human subject) from one or more first viewpoints. The set of image sensors 106 may further include a second image sensor that may capture one or more second images of the object 110 from one or more second viewpoints. The set of images captured by the set of image sensors 106 may include the one or more first images and the one or more second images. For example, the captured set of images may include a first image 112A, a second image 112B, and a third image 112C. The set of image sensors 106 may be configured to transmit the captured set of images to the electronic device 102, via the communication network 108. In an embodiment, each image sensor of the set of image sensors 106 may be pre-calibrated and operations of the set of image sensors 106 may be synchronized such that the set of images is captured concurrently. Examples of an image sensor may include, but are not limited to, a charge-coupled device (CCD) sensor, a complementary metal-oxide semiconductor (CMOS) sensor, a wide-angle camera, an action camera, a camcorder, a digital still camera, a camera phone, a time-of-flight camera (ToF camera), and a night-vision camera. In one embodiment, the set of image sensors 106 may be integrated or embedded into the electronic device 102.

The communication network 108 may include a communication medium through which the electronic device 102 may communicate with the server 104 and the set of image sensors 106. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN), a mobile wireless network, such as a Long-Term Evolution (LTE) network (for example, $4^{th}$ Generation or $5^{th}$ Generation (5G) mobile network (i.e. 5G New Radio)). Various devices of the network environment 100 may be configured to connect to the communication network 108, in accordance with various wired or wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, Bluetooth (BT) communication protocols, or a combination thereof.

In operation, the set of image sensors 106 may be configured to capture a set of images from a set of viewpoints. Each image may include an eye of the object 110 from a respective viewpoint, which may be associated with a position of an image-sensor (of the set of image sensors 106). As shown, for example, the captured set of images may include the first image 112A, the second image 112B, and the third image 112C. The electronic device 102 may acquire the set of images from the set of image sensors 106, through an input/output (I/O) interface or through a network interface associated with the communication network 108.

The electronic device 102 may be configured to further acquire a 3D mesh of a head portion of the object 110 from the server 104. In an embodiment, the server 104 may be configured to estimate the 3D mesh of the head portion of the object 110 based on a plurality of images of the object 110. In an embodiment, the plurality of images of the object 110 may include at least the set of images comprising the eye of object 110. The server 104 may be configured to transmit the estimated 3D mesh of the head portion to the electronic device 102. Thus, the electronic device 102 may acquire the 3D mesh from the server 104.

The electronic device 102 may be further configured to process the acquired set of images (e.g., the first image 112A, the second image 112B, and the third image 112C) to extract 3D feature points associated with one or more regions of the eye. Examples of the one or more regions of the eye may include, but are not limited to, eyelids, a limbus, a sclera, a pupil, and an iris. The electronic device 102 may be further configured to fit a sphere to the extracted 3D feature points and may, thereafter, estimate an initial pose transformation between the 3D template mesh and the fitted sphere. The initial pose transformation may be estimated to initialize a pose of the eyeball in the 3D template mesh for further refinement of the pose.

The electronic device 102 may be further configured to execute one or more operations by using the 3D template mesh to interpolate a first set of points. The first set of points may correspond to the one or more regions of the eye. Thereafter, the electronic device 102 may determine a second set of points based on sampling parameters associated with the interpolated first set of points. The second set of points may also correspond to the one or more regions of the eye. The electronic device 102 may be further configured to determine a final pose transformation based on a minimization of a difference between the first set of points and the second set of points. The final pose transformation may be determined to accurately position the eyeball in the 3D template mesh based on refinements on the initial pose transformation.

The electronic device 102 may fit the 3D template mesh into an eyeball socket of the 3D mesh, based on the determined final pose transformation. By fitting the 3D template mesh, a final 3D mesh of the head portion of the object 110 may be generated. Since the process to obtain the final pose transformation is mostly automated; therefore, it may be possible to position and fit the 3D template mesh of the eye into the eyeball socket of the 3D mesh of the head portion, without significant human inputs. Various operations of the electronic device 102 for eyeball positioning for 3D head modeling are described further, for example, in FIGS. 3A, 3B, 6, 7, 8, 9A, 9B, 9C, 9D, 10, 11A, 11B, 12, and 13.

Figure 2:
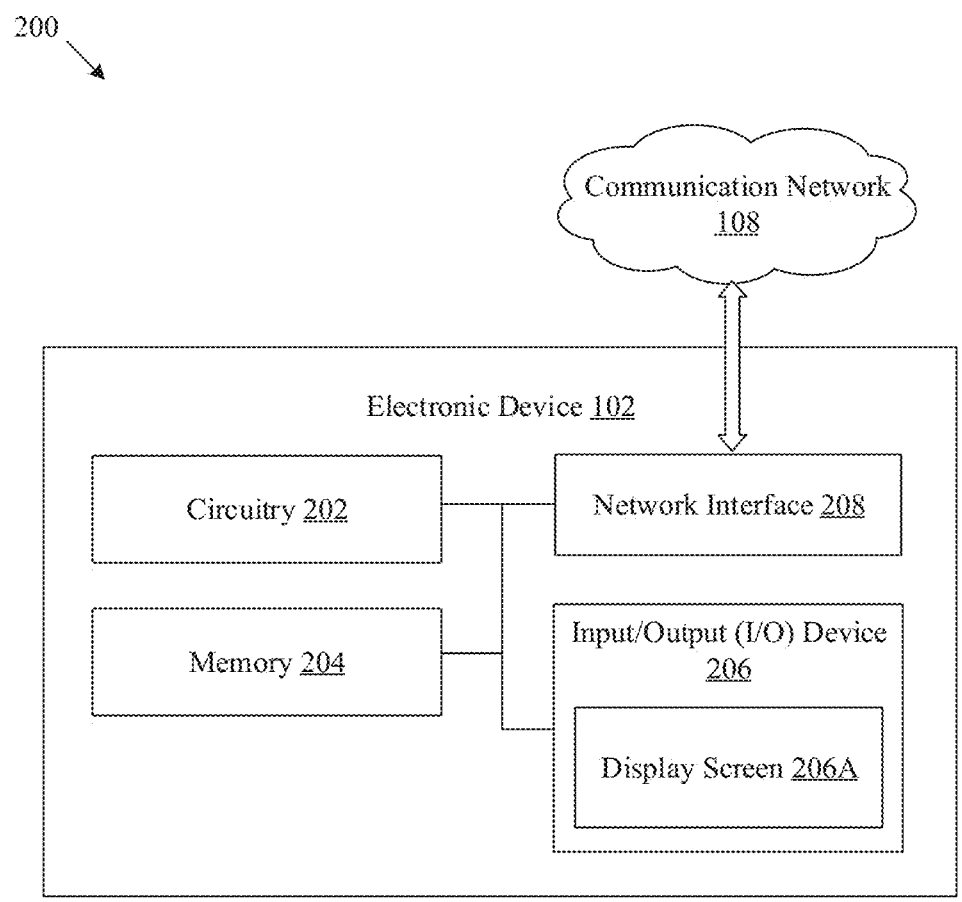
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may include circuitry 202, a memory 204, an input/output (I/O) device 206, and a network interface 208. The I/O device 206 may include a display screen 206A. The circuitry 202 may be communicatively coupled to the memory 204, the I/O device 206, and the network interface 208. The circuitry 202 may be configured to communicate with the server 104 and the set of image sensors 106, by use of the network interface 208, via the communication network 108.

The circuitry 202 may include suitable logic, circuitry, and interfaces that may be configured to execute program instructions associated with different operations to be executed by the electronic device 102. The circuitry 202 may be implemented based on a number of processor technologies known in the art. Examples of the processor technologies may include, but are not limited to, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

The memory 204 may include suitable logic, circuitry, and/or interfaces that may be configured to store a set of instructions executable by the circuitry 202. The memory 204 may be configured to store an operating system and associated applications. In accordance with an embodiment, the memory 204 may be also configured to store the acquired set of images of the object 110. The memory 204 may also store the acquired three-dimensional (3D) mesh, the acquired 3D template mesh, information associated with the initial pose transformation, and information associated with the final pose transformation. Examples implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input from a user. For example, the I/O device 206 may be configured to receive instructions to capture the set of images as a user input. Also, the I/O device 206 may receive one or more user inputs required for the automated eyeball positioning in the 3D template mesh. The I/O device 206 may be also configured to provide an output to the user. For example, as part of the I/O device 206, the display screen 206A may render a final 3D mesh of the head portion of the object 110, based on the automated eyeball positioning in the 3D template mesh of the eye and the fitting of the 3D template mesh into the eyeball socket of the 3D mesh. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display screen 206A and/or a speaker.

The display screen 206A may include suitable logic, circuitry, interfaces, and/or code that may be configured to render an application interface to display the final 3D mesh of the head portion of the object 110. In accordance with an embodiment, the display screen 206A may be a touch screen, where input from the user may be received via the application interface. The display screen 206A may capture the input based on an input received from the user. The user may be able to provide inputs by activating and/or interacting with one or more of a plurality of buttons or UI elements displayed on the touch screen. In accordance with an embodiment, the display screen 206A may receive the input through a virtual keypad, a stylus, a gesture-based input, and/or a touch-based input. The display screen 206A may be realized through several known technologies such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display screen 206A may refer to a display screen of smart-glass device, a see-through display, a projection-based display, an electro-chromic display, and/or a transparent display.

The network interface 208 may include suitable logic, circuitry, code, and/or interfaces that may be configured to facilitate communication among the circuitry 202, the server 104, and the set of image sensors 106, via the communication network 108. The network interface 208 may be implemented by use of various known technologies to support wired or wireless communication of the electronic device 102 with the communication network 108. The network interface 208 may include, but not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), a $5^{th}$ generation network such as 5G new radio (NR) network, a 5G smart antenna, time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The network interface 208 may be capable to communicate with a 5G communication network and will include appropriate 5G support functionality such as, but not limited to, a 5G NR, a V2X Infrastructure, and a 5G Smart Antenna. Various operations of the circuitry 202 for eyeball positioning for 3D head modeling are described further, for example, in FIGS. 3A, 3B, 4, 5, 6, 7, 8, 9A, 9B, 9C, 9D, 10, 11A, 11B, 12, and 13.

Figure 3A:
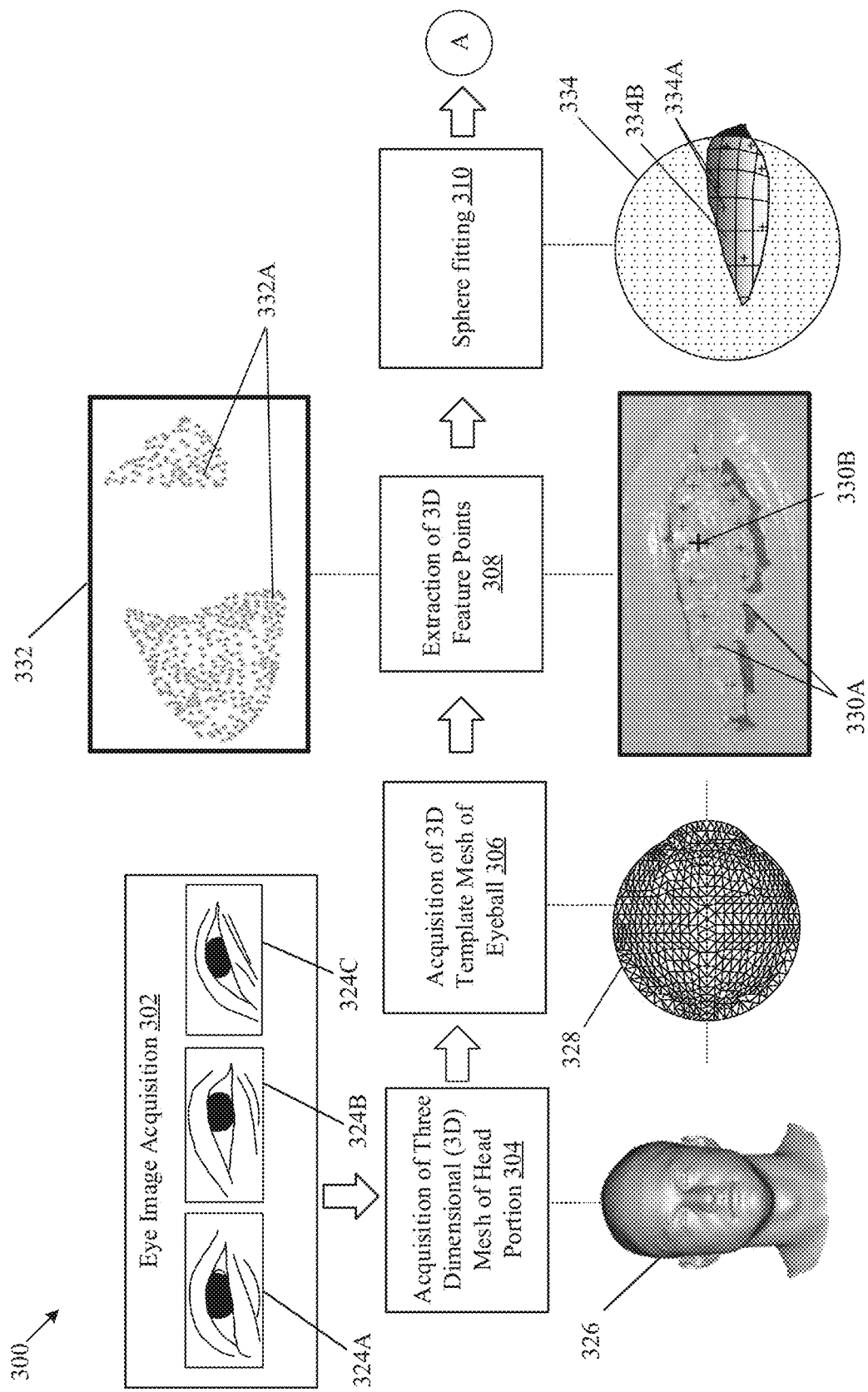
FIGS. 3A and 3B, collectively, depict a diagram that illustrates an exemplary processing pipeline for eyeball positioning for three-dimensional (3D) head modeling, in accordance with an embodiment of the disclosure.
Figure 3B:
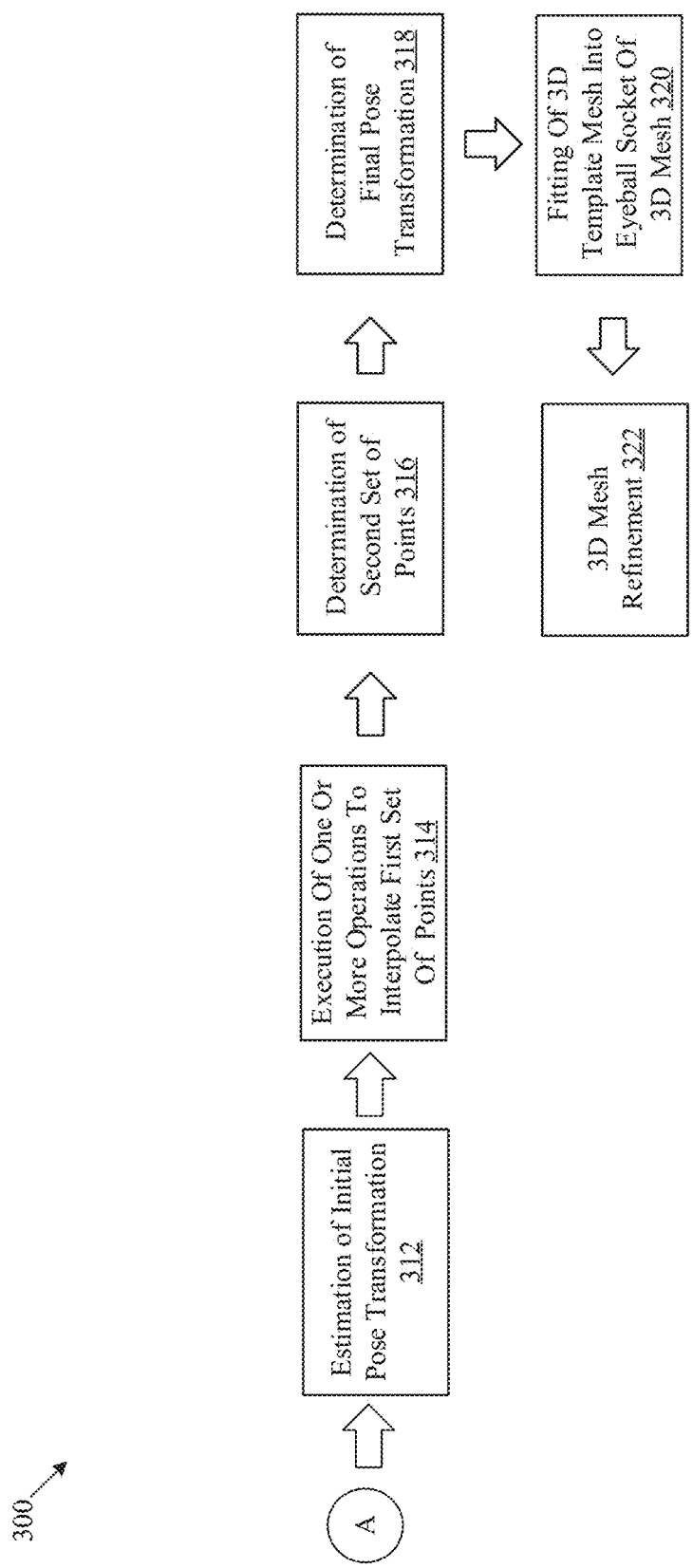

FIGS. 3A and 3B, collectively, depict a diagram that illustrates an exemplary processing pipeline for positioning an eyeball 3D mesh for three-dimensional (3D) head modeling, in accordance with an embodiment of the disclosure. FIGS. 3A and 3B are explained in conjunction with elements from FIG. 1 and FIG. 2. With reference to FIG. 3A and FIG. 3B, there is shown a processing pipeline of operations from 302 to 310 for eyeball positioning for 3D head modeling. The circuitry 202 may execute the operations from 302 to 322, as described herein.

At 302, an eye image acquisition operation may be executed. As part of the eye image acquisition operation, the set of image sensors 106 may capture a set of images of the object 110 from a set of viewpoints. The set of images may include at least an eye of the object 110. Each of the set of image sensors 106 may be pre-calibrated and synchronized with one another before the set of images is captured. For example, the set of image sensors 106 may include a first image sensor that may capture one or more first images of the object 110 (e.g., a human subject) from one or more first viewpoints. The set of image sensors 106 may further include a second image sensor that may capture one or more second images of the object 110 from one or more second viewpoints. The set of images captured by the set of image sensors 106 may include the one or more first images and the one or more second images. As shown, for example, the captured set of images may include a first image 324A, a second image 324B, and a third image 324C. The first image 324A may be captured from a first viewpoint that may correspond to a non-frontal pose of the head of the object 110 at +30 degrees yaw axis. The second image 324B may be captured from a second viewpoint that may correspond to a frontal pose of the head of the object 110 at a 0-degree yaw axis. Similarly, the third image 324C may be captured from a third viewpoint that may correspond to another non-frontal pose of the head of the object 110 at a −30 degrees yaw axis.

The set of image sensors 106 may be configured to transmit the set of images (e.g., the first image 324A, the second image 324B, and the third image 324C) of the object 110 to the electronic device 102, via the communication network 108. Alternatively, the circuitry 202 may acquire the set of images (e.g., the first image 324A, the second image 324B, and the third image 324C) from the set of image sensors 106, through an I/O interface. For example, in a scenario where the set of image sensors 106 is integrated or embedded into the electronic device 102, the circuitry 202 may acquire the set of images (e.g., the first image 324A, the second image 324B, and the third image 324C) from the set of image sensors 106, via the I/O interface.

At 304, a three-dimensional (3D) mesh may be acquired. In an embodiment, the circuitry 202 may be configured to acquire a 3D mesh of a head portion of the object 110. The 3D mesh may be acquired from the server 104. Prior to the acquisition of the 3D mesh, the server 104 may be configured to estimate the 3D mesh of the head portion of the object 110 based on a plurality of images of the object 110 captured by the set of image sensors 106. The plurality of images of the object 110 may include at least a set of images, which includes the eye of object 110. The server 104 may be configured to transmit the estimated 3D mesh to the electronic device 102, via the communication network 108. In an embodiment, prior to the acquisition of the 3D mesh, the circuitry 202 may be configured to estimate the 3D mesh and store the estimated 3D mesh in the memory 204. The estimated and pre-stored 3D mesh may be acquired from the memory 204 at 304.

The method of estimation of the 3D mesh may include, for example, a photogrammetry-based method (such as structure from motion (SfM)), a method which requires stereoscopic images, or a method which requires monocular cues (such as shape from shading (SfS), photometric stereo, or shape from texture (SfT)). Such techniques may be known to one ordinarily skilled in the art; therefore, details of such techniques have been omitted from the disclosure for the sake of brevity.

In an embodiment, a photogrammetric reconstruction method may be used to estimate the 3D mesh of the head portion of the object 110 based on the plurality of images of the object 110. The photogrammetric reconstruction method may include operations, such as, but not limited to, a feature detection and matching operation, a sparse reconstruction operation, a multi-view stereo operation, and a fusion and meshing operation. By way of an example, and not limitation, the photogrammetric reconstruction may be a Structure-from-motion based reconstruction, as described in, Schönberger, Johannes L., and Jan-Michael Frahm, "Structure-from-motion revisited", Proceedings IEEE Conference on Computer Vision and Pattern Recognition (CVPR), 2016. By way of another example, and not limitation, the photogrammetric reconstruction may be based on a pixelwise view selection, as described in, Schönberger, Johannes L., et al., "Pixelwise view selection for unstructured multi-view stereo", European Conference on Computer Vision (ECCV), 2016. As shown, for example, a 3D mesh 326 may be acquired.

In an embodiment, prior to a use of the acquired 3D mesh 326 for eyeball positioning for 3D head modeling, as described further, for example, in FIGS. 3A and 3B, the acquired 3D mesh 326 may be processed through a mesh clean-up pipeline. The mesh clean-up pipeline may include a group of operations that may be executed by the electronic device 102. In another embodiment, the group of operations may be executed by the server 104 and a cleaned-up 3D mesh, obtained based on the group of the operations may be acquired from the server 104 by the electronic device 102. In an embodiment, the group of operations may include a first set of operations that may be executed on the acquired 3D mesh to generate a second 3D mesh. The first set of operations may include a removal of one or more regions which may be unneeded for object-shape estimation and/or a removal of one or more mesh artifacts associated with a 3D shape or a topology of the acquired 3D mesh. The group of operations may further include a processing of a 3D template head mesh to determine a set of filling patches which may corresponds to a set of holes in the second 3D mesh. The group of operations may further include execution of a hole filling operation, based on the second 3D mesh and the set of filling patches, to generate a cleaned-up 3D mesh. The cleaned-up 3D mesh associated with the head-portion of the object 110 may be used further for eyeball positioning. Hereinafter, the cleaned-up 3D mesh may be referred to as the 3D mesh 326. In another embodiment, the acquired 3D mesh 326 may not be processed through the mesh clean-up pipeline. In such a case, the acquired 3D mesh 326 that may be considered as a raw 3D scan of the head portion of the object 110. An example of the 3D mesh is provided, for example, in FIG. 4.

At 306, a 3D template mesh of an eyeball may be acquired. In an embodiment, the circuitry 202 may be configured to acquire the 3D template mesh (e.g., a 3D template mesh 328) of the eyeball of an object, such as the object 110. The 3D template mesh 328 may be stored on the server 104. The server 104 may be configured to transmit the 3D template mesh 328 to the electronic device 102, via the communication network 108. In an embodiment, the 3D template mesh 328 may be pre-stored in the memory 204 of the electronic device 102. In such a case, the circuitry 202 may acquire the 3D template mesh 328 from the memory 204. An example of the 3D template mesh and an eyeball socket of the 3D mesh 326 is provided, for example, in FIG. 5.

At 308, 3D feature points may be extracted. In an embodiment, the circuitry 202 may be configured to process the acquired set of images to extract the 3D feature points. The 3D feature points may be associated with one or more regions of the eye. Examples of the one or more regions of the eye may include, but are not limited to, eyelids, a limbus, a sclera, a pupil, and an iris.

In an embodiment, the circuitry 202 may be configured to identify a set of two-dimensional (2D) feature points of the eye in each of the acquired set of images (e.g., the first image 324A, the second image 324B, and the third image 324C). Further, the circuitry 202 may determine a 3D position of each of the set of 2D feature points, based on a set of camera parameters associated with one or more image-capture devices (e.g., the set of image sensors 106) that captured the set of images. The 3D features points may be extracted based on the determined 3D position. In an embodiment, the identification of the set of 2D feature points may be based on one or more of, but not limited to, a user input, an eyelid detection technique, or an eye part segmentation technique. The set of 2D feature points may include contour points along eyelids of the eye and a point at a center of a pupil of the eye. For example, a first set of 3D feature points 330A associated with the contours of the eyelids and a second 3D feature point 330B associated with the center of the pupil may be extracted based on the processing of the acquired set of images. The first set of 3D feature points 330A and the second 3D feature point 330B are shown in an eye portion 330 of the 3D mesh (e.g., the 3D mesh 326).

In an embodiment, the circuitry 202 may be configured to process a raw 3D scan (not shown in FIG. 3A) of the head portion of the object 110 to extract 3D points corresponding to a sclera of the one or more regions of the eye. For example, in FIG. 3A, there are shown 3D points 332A corresponding to the sclera of an eye portion 332 of the raw 3D scan. The extraction of the 3D feature points, and the 3D points are described further, for example, in FIG. 6.

At 310, a sphere fitting operation may be executed. In an embodiment, the circuitry 202 may be configured to execute the sphere fitting operation. The sphere fitting operation may include fitting of a sphere (e.g., a sphere 334) to the extracted 3D feature points (for example, a set of 3D feature points 334A). FIG. 3A also depicts a point 334B, which may be the center of the fitted sphere 334. In an embodiment, the fitting of the sphere 334 to the extracted 3D feature points (for example, the set of 3D feature points 334A) may be based on an expression (1), which is given as follows.

$$\min_{c,r} \sum_{i=1}^{n} [(x_i - c \cdot x)^2 + (y_i - c \cdot y)^2 + (z_i - c \cdot z)^2 - r^2]^2 \quad (1)$$

such that $r_{min} \leq r \leq r_{max}$
where,
[$x_i, y_i, z_i$]$^T$ may represent coordinates of an extracted 3D feature point;
n may represent a number of the extracted 3D feature points.
c.x, c.y, and c.z may represent coordinates of the center of the fitted sphere 334;
r may represent a fitted radius of the fitted sphere 334; and
$r_{min}$ and $r_{max}$ may represent a minimum value and a maximum value for the fitted radius (i.e., r) based on a real-life size of the human eye.

In an embodiment, the circuitry 202 may be configured to process the raw 3D scan of the head portion of the object 110 to extract the 3D points (e.g., the 3D points 332A) corresponding to the sclera of the one or more regions of the eye, as described at 308. The circuitry 202 may also fit the sphere 334 to the extracted 3D points (e.g., the 3D points 332A), based on the expression (1).

In an embodiment, the circuitry 202 may be further configured to estimate a scale factor (which may be denoted by "s") that may correspond to a ratio of a radius (i.e., "r") of the fitted sphere 334 to a radius (which may be denoted by "$r_{eye}$") of the 3D template mesh 328. The scale factor may be estimated based on an equation (2), which is given as follows:

$$s = \frac{r}{r_{eye}} \quad (2)$$

The estimation of the scale factor may be done to correctly scale the template 3D mesh 328 so that the template 3D mesh 328 matches a scale/size of the eyeball socket of the 3D mesh 326. The 3D template mesh 328 may be fitted into an eyeball socket of the 3D mesh 326 based on the estimated scale factor (i.e., "s"). The scale factor may be referred as a scale parameter of a pose transformation.

At 312, an initial pose transformation may be estimated. In an embodiment, the circuitry 202 may be configured to estimate the initial pose transformation. The initial pose transformation may be between the 3D template mesh 328 and the fitted sphere 334. In addition to the scale factor, a rotation parameter and a translation parameter of the initial pose transformation may be estimated. The estimation of the scale factor is described further, for example, at 310.

The circuitry 202 may be configured to estimate the rotation parameter of the initial pose transformation between a first vector along an axis of rotation of the 3D template mesh 328 and a second vector that may span from a center (e.g., the point 334B) of the fitted sphere 334 to a 3D point that may correspond to a center of a pupil of the eye. Similarly, the circuitry 202 may be configured to estimate the translation parameter of the initial pose transformation based on an offset between the center (e.g., the point 334B) of the fitted sphere 334 and the center of the 3D template mesh 328. The estimation of the initial pose transformation based on the estimation of the rotation parameter and the translation parameter of the initial pose transformation is described further, for example, in FIG. 7.

At 314, one or more operations may be executed to interpolate a first set of points. In an embodiment, the circuitry 202 may be configured to execute one or more operations by using the 3D template mesh 328 to interpolate a first set of points. The first set of points may correspond to the one or more regions of the eye. Examples of the one or more regions of the eye may include, but are not limited to, eyelids, a limbus, a sclera, a pupil, and an iris.

In an embodiment, to interpolate the first set of points, the circuitry 202 may be configured to label contours of the one or more regions, including eyelids, a limbus, and a pupil in the acquired set of images (for example, the first image 324A, the second image 324B, and the third image 324C). The circuitry 202 may be further configured to project one or more contours of the labeled contours to a 3D coordinate space, based on defined camera parameters. Further, the circuitry 202 may determine a set of contour points as intersecting points of the projection on the 3D template mesh 328. The determination of the set of contour points is described further, for example, in FIG. 8.

In an embodiment, the executed one or more operations may include, but not limited to, a first operation to unwrap the 3D template mesh 328 to a UV coordinate space and a second operation to apply one or more interpolation methods. The unwrapped 3D template mesh may include the determined set of contour points in the UV coordinate space. Further, the one or more interpolation methods may be applied to fit spline curves into eyelid points of the set of contour points and fit a circle into limbus points of the set of contour points. The fitting of the spline curves and the circle may be based on the initial pose transformation and a parameter for sampling points used in the one or more interpolation methods. In an embodiment, the first set of points may correspond to points included in each of the fitted spline curves and the fitted circle. The first operation is described further, for example, in FIG. 8. The second operation is described further, for example, in FIG. 10. Examples of interpolated eyelid points and limbus points are described further, for example, in FIG. 11A.

In another embodiment, to interpolate the first set of points, the circuitry 202 may be configured to label one or more points on an iris mesh component of the template 3D mesh 328. The labeled one or more points may correspond to a location of a pupil in the iris mesh component. The circuitry 202 may be configured to update positions of the labeled one or more points, based on a refractive index of a cornea of the eye and an intersection of a plane formed by the labeled one or more points with rays cast from a reference position outside the template 3D mesh 328. The first set of points may include the updated positions of the labeled one or more points. The interpolation of pupil points is described further, for example, in FIGS. 9A, 9B, 9C, and 9D. Examples of the interpolated pupil points are described further, for example, in FIG. 11B.

In an embodiment, the circuitry 202 may be configured to process a raw 3D scan of the head portion of the object 110 to extract 3D points (e.g., the 3D points 332A) corresponding to the sclera of the one or more regions of the eye. The circuitry 202 may be further configured to determine vertex positions corresponding to the sclera on the 3D template mesh 328 based on the extracted 3D points 332A. Further, the circuitry 202 may determine reference 3D points on the 3D template mesh 328 based on the determined vertex positions. The determination of the reference 3D points on the 3D template mesh 328 is described further, for example, in FIG. 10.

At 316, a second set of points may be determined. In an embodiment, the circuitry 202 may be configured to determine a second set of points, based on sampling parameters associated with the interpolated first set of points. Similar to the first set of points, the determined second set of points may correspond to the one or more regions of the eye. The determination of the second set of points is described further, for example, in FIG. 12.

At 318, a final pose transformation may be determined. In an embodiment, the circuitry 202 may be configured to determine the final pose transformation, based on a minimization of a difference between the first set of points and the second set of points. In an embodiment, the determination of the final pose transformation may be further based on a minimization of a distance between the reference 3D points and the extracted 3D points. The determination of the final pose transformation is described further, for example, in FIG. 12.

At 320, the 3D template mesh 328 may be fitted into the eyeball socket of the 3D mesh 326. The 3D mesh 326 may include an empty eyeball socket with a space to include an eyeball mesh. The circuitry 202 may be configured to fit the 3D template mesh 328 into the eyeball socket of the 3D mesh 326, based on the determined final pose transformation and the estimated scale factor (i.e., "s", as described further at 310).

Based on the estimated scale factor, the 3D template mesh 328 may be scaled to a size that may be suitable for the space provided in the empty eyeball socket of the 3D mesh 326. The scaled 3D template mesh 328 may then be fitted into the eyeball socket of the 3D mesh 326. The scaled 3D template mesh 328 of the eyeball may be accurately positioned in the 3D template mesh 328, based on the determined final pose transformation. The final pose transformation may specify an amount of rotation (or orientation) and translation required to accurately position the scaled 3D template mesh 328 into the eyeball socket. After fitting, the scaled 3D template mesh 328 may impart photorealism to an eye portion of the 3D mesh 326.

At 322, the 3D mesh 326 may be refined. In an embodiment, the circuitry 202 may be configured to apply, around an eyelid contour of the 3D mesh 326, an as-rigid-as-possible (ARAP) deformation over the 3D mesh 326, to obtain a refined 3D mesh. The ARAP deformation may be applied based on a position of the eyelid contour and the final pose transformation. In an embodiment, the 3D template mesh 328 may be fitted into the eyeball socket of the refined 3D mesh. The refinement of the 3D mesh 326 is described further, for example, in FIG. 13.

In conventional methods, the 3D mesh 326 that may represent the 3D shape of the head portion of the object 110 may be manually refined to accurately represent and position the eyeball in the 3D mesh 326. A human modeler may refine the 3D mesh 326 by manual selection of vertices of the 3D mesh 326 and may update locations of the selected vertices in the 3D mesh 326 to position the eyeball in the 3D mesh 326. However, manual refinement of the 3D mesh 326 may require significant amount of time and effort and may be prone to errors. In contrast, the present disclosure provides a method for automated eyeball positioning in the 3D mesh 326 of the head portion of the object 110. The present disclosure makes use of 3D/2D key points corresponding to an eye region to calculate a scale factor for a template eyeball mesh and to iteratively determine a pose transformation. The determination of the pose transformation may be modeled as an optimization problem (such as a minimization of an objective function). The pose transformation which results in the minimization of the objective function may be considered as the final pose transformation. Since the pose transformation is determined automatically, the disclosed method may not just save time, but may result in a more accurate eyeball positioning.

Figure 4:
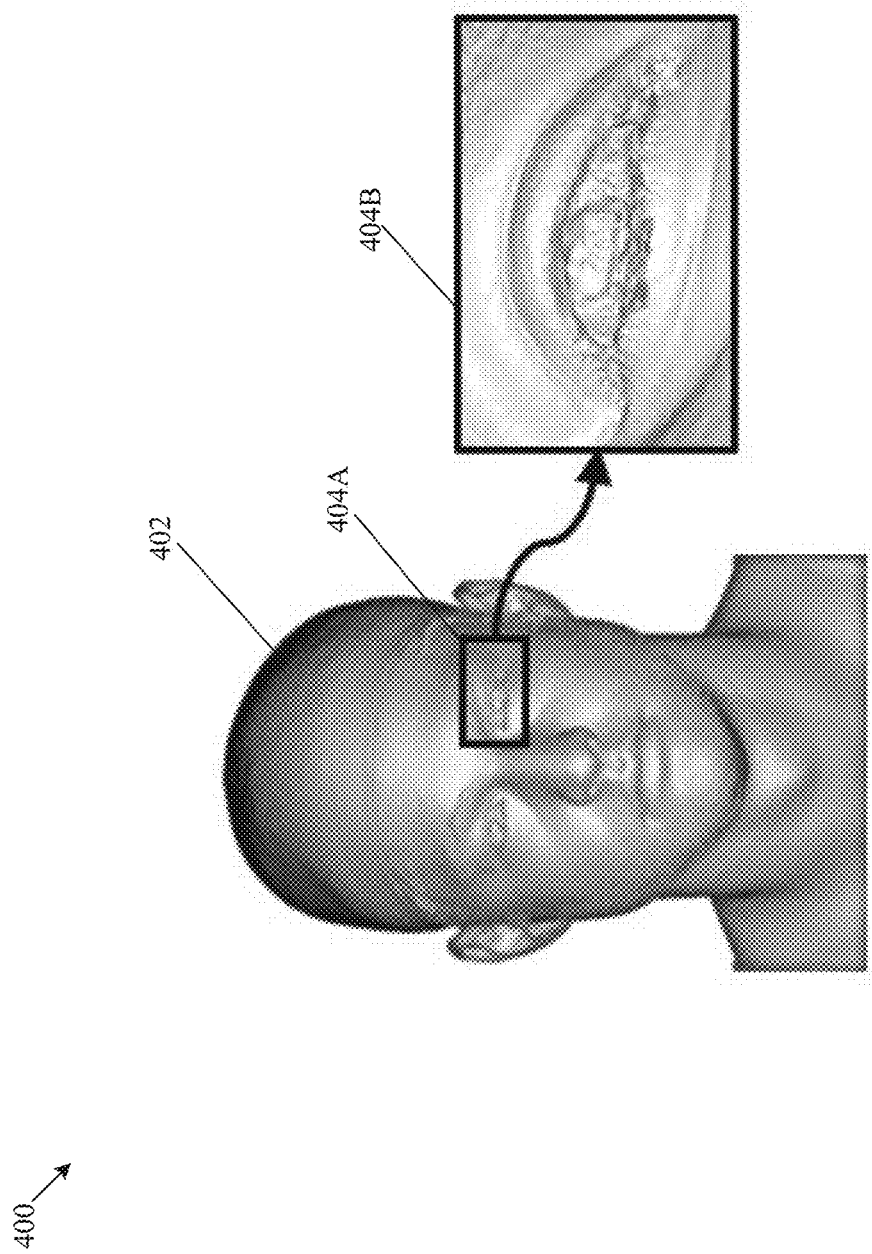
FIG. 4 is a diagram that illustrates an example of a 3D mesh of a head portion of an object including an eye portion, in accordance with an embodiment of the disclosure.

FIG. 4 is a diagram that illustrates an example of a 3D mesh of a head portion of an object including an eye portion, in accordance with an embodiment of the disclosure. FIG. 4 is described in conjunction with elements from FIGS. 1, 2, 3A, and 3B. With reference to FIG. 4, there is shown a diagram 400. The diagram 400 may include an exemplary 3D mesh 402 of a head portion of an object (e.g., the object 110). The diagram 400 may further include an exemplary eye portion 404A of the 3D mesh 402 and an expanded view 404B of the eye portion 404A of the 3D mesh 402.

In an embodiment, the circuitry 202 may be configured to acquire the 3D mesh 402, as described, for example, in FIG. 3A. The 3D mesh 402 may be a 3D model of the head portion of the object 110. In an embodiment, the 3D mesh 402 may be a raw 3D scan of the head portion of the object 110. In another embodiment, the 3D mesh 402 may be obtained by processing the raw 3D scan through a mesh clean-up pipeline. In such a case, the 3D mesh 402 may be a cleaned-up 3D mesh, as described, for example, in FIG. 3A.

The eye portion 404A of the 3D mesh 402 may include a region of the 3D mesh 402 that includes eyes of the object 110. The eyes of the object 110 may be open in the eye portion 404A. Though the eye portion 404A may be the region of the 3D mesh 402 that includes the eyes, the eye portion 404A may not include separate a structure for each eyeball. In other words, the eye portion 404A may include a structure for an entire eye, however, the eye portion 404A may not include a specific eyeball structure. A quality of 3D mesh 402 for the eye portion 404A may be low due to a high specular reflection on a surface of the eyeballs and an occlusion that may be caused by the eyelashes. The 3D mesh 402 and the eye portion 404A of FIG. 4 are merely shown as examples of a head mesh reconstructed from images and an eye portion of the head mesh. Such examples should not be construed as limiting the scope of the disclosure.

Figure 5:
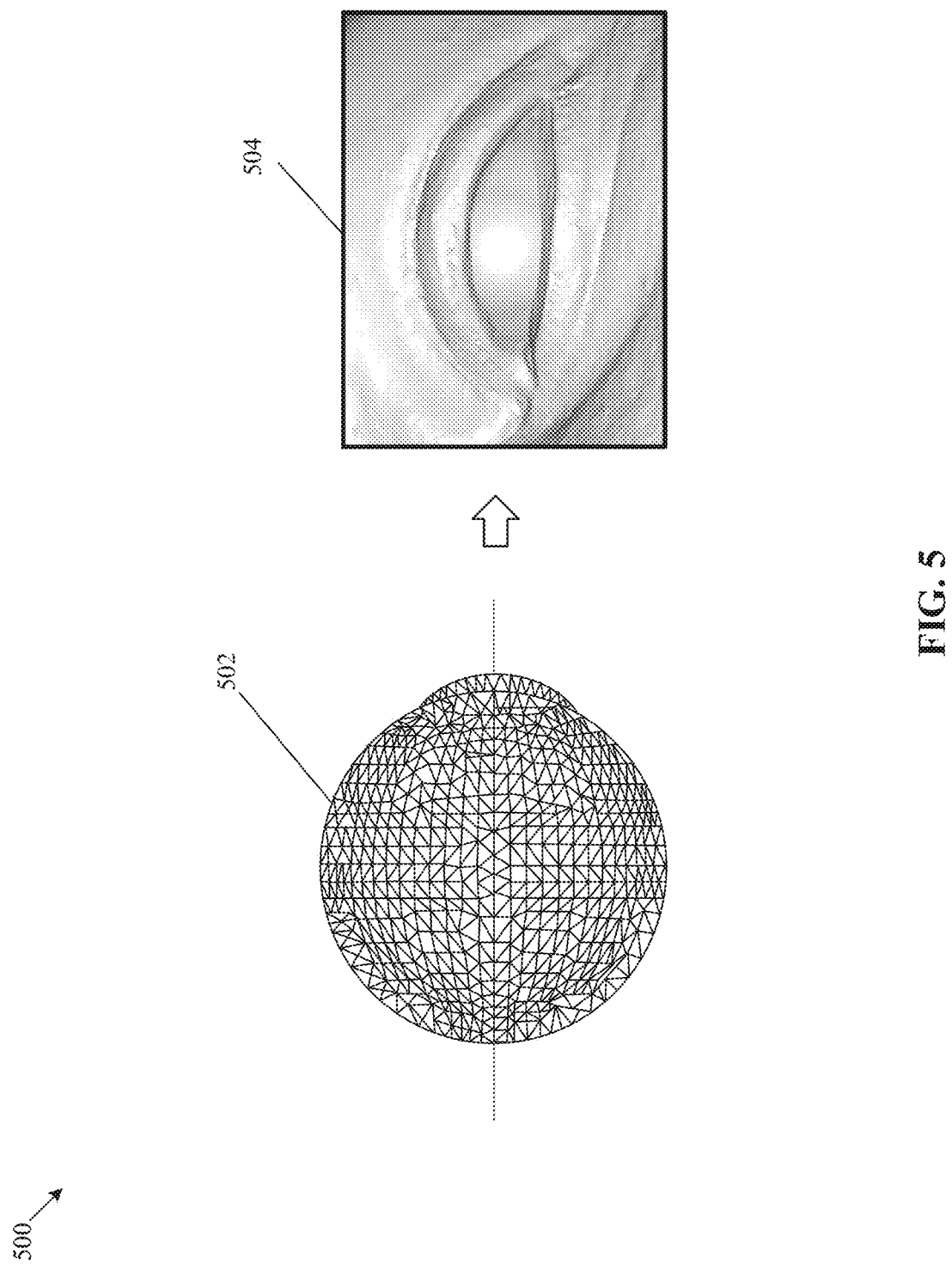
FIG. 5 is a diagram that illustrates an example of a 3D template mesh of an eyeball and an example of an eyeball socket of a 3D mesh of a head portion of an object, in accordance with an embodiment of the disclosure.

FIG. 5 is a diagram that illustrates an example of a 3D template mesh of an eyeball and an example of an eyeball socket of a 3D mesh of a head portion of an object, in accordance with an embodiment of the disclosure. FIG. 5 is described in conjunction with elements from FIGS. 1, 2, 3A, 3B, and 4. With reference to FIG. 5, there is shown a diagram 500. The diagram 500 may include an exemplary 3D template mesh 502 of an eyeball. The diagram 500 may further include an exemplary eyeball socket 504 of a 3D mesh (e.g., the 3D mesh 326) of a head portion of the object 110.

The circuitry 202 may be configured to acquire the 3D template mesh 502, as described, for example, in FIG. 3A. After the acquisition, the circuitry 202 may be configured to fit the 3D template mesh 502 into the eyeball socket 504 of the 3D mesh 326, based on the determined final pose transformation. The determination of the final pose transformation is described further, for example, in FIGS. 3A-3B and 12. The 3D template mesh 502 may be fitted into the eyeball socket 504 further based on the estimated scale factor (i.e., "s"), as described further, for example, in FIG. 3A. The 3D template mesh 502 and the eyeball socket 504 of FIG. 5 are for exemplary purposes and should not be construed as limiting the scope of the disclosure.

Figure 6:
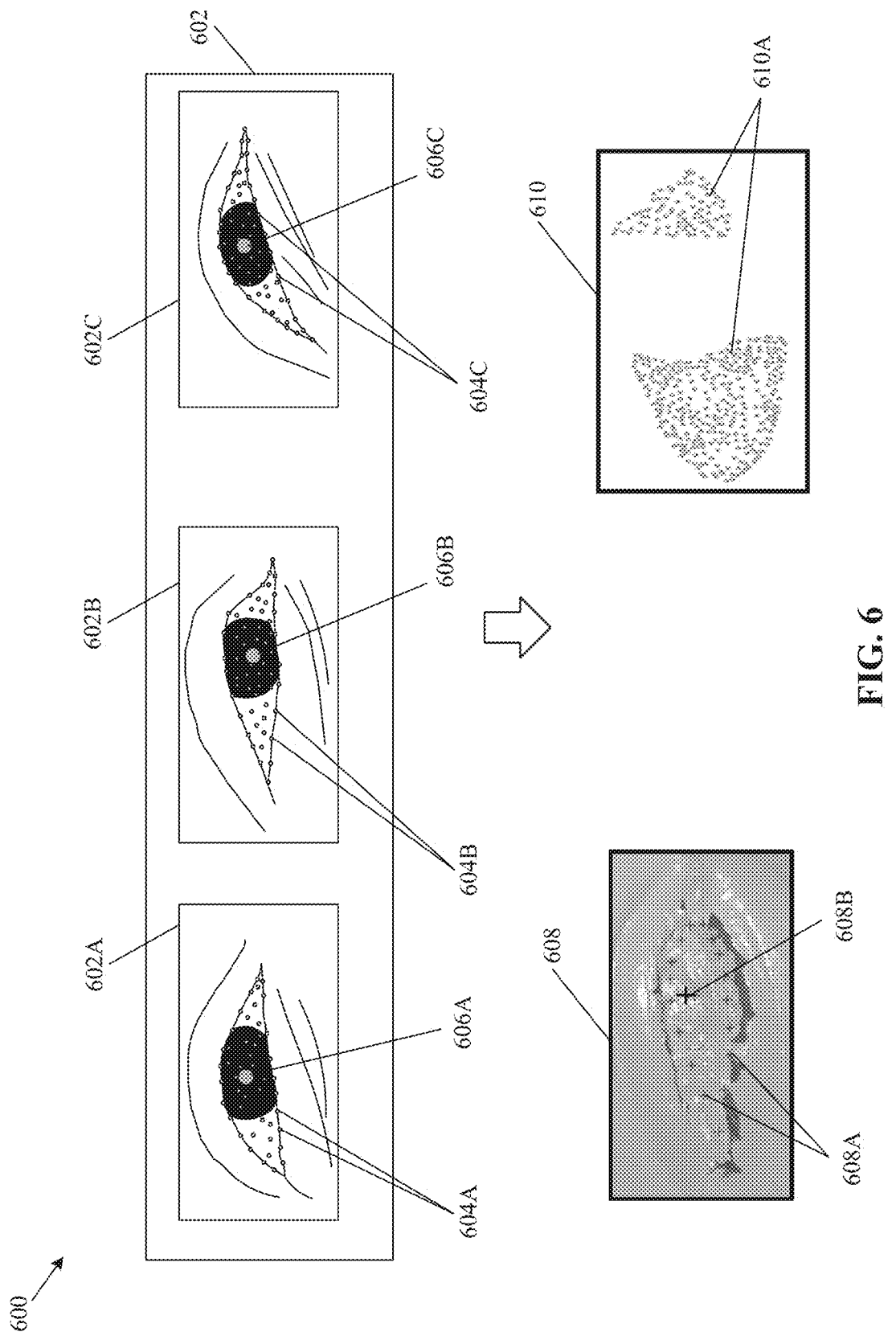
FIG. 6 is a diagram that illustrates an exemplary scenario for extraction of 3D feature points associated with one or more regions of an eye and extraction of 3D points corresponding to a sclera of the one or more regions of the eye, in accordance with an embodiment of the disclosure.

FIG. 6 is a diagram that illustrates an exemplary scenario for extraction of 3D feature points associated with one or more regions of an eye and extraction of 3D points corresponding to a sclera of the eye, in accordance with an embodiment of the disclosure. FIG. 6 is described in conjunction with elements from FIGS. 1, 2, 3A, 3B, 4, and 5. With reference to FIG. 6, there is shown an exemplary scenario 600. The scenario 600 may include a set of images 602, an eye portion 608 of the 3D mesh 326, and an eye portion 610 of the raw 3D scan. The set of images 602 may include images of an eye of the object 110. As shown, for example, the set of images 602 includes a first image 602A, a second image 602B, and a third image 602C.

The circuitry 202 may be configured to acquire the set of images 602 from the set of image sensors 106, as described, for example, in FIG. 3A. Thereafter, the circuitry 202 may be configured to process the acquired set of images 602 to extract the 3D feature points. The 3D feature points may be associated with one or more regions of the eye. Examples of the one or more regions of the eye may include, but are not limited to, eyelids, a limbus, a sclera, a pupil, and an iris.

In an embodiment, the circuitry 202 may be configured to identify the set of 2D feature points of the eye in each of the acquired set of images 602. The identification of the set of 2D feature points may be based on a user input, an eyelid detection technique, or an eye part segmentation technique. The set of 2D feature points may include contour points along eyelids of the eye and a point at a center of a pupil of the eye. For example, as shown in FIG. 6, first contour points 604A, second contour points 604B, and third contour points 604C may be identified in the first image 602A, the second image 602B, and the third image 602C, respectively, as the contour points along eyelids of the eye. Additionally, a first point 606A, a second point 606B, and a third point 606C may be identified as points at the center of the pupil of the eye in the first image 602A, the second image 602B, and the third image 602C, respectively. The set of 2D feature points identified from the set of images 602 may include the first contour points 604A, the second contour points 604B, the third contour points 604C, the first point 606A, the second point 606B, and the third point 606C.

The circuitry 202 may be further configured to determine a 3D position of each of the identified set of 2D feature points, based on a set of camera parameters associated with one or more image-capture devices (e.g., the set of image sensors 106) that captured the set of images 602. Such camera parameters may be intrinsic and extrinsic camera parameters.

In an embodiment, the 3D position of each 3D feature point may be determined based on a triangulation of the identified set of 2D feature points. The 3D features points may be extracted based on the determined 3D position. For example, as shown in FIG. 6, a first set of 3D feature points 608A associated with the contours of the eyelids and a second 3D feature point 608B associated with the center of the pupil may be extracted from the eye portion 608 of the 3D mesh 326 based on the processing of the acquired set of images 602.

In an embodiment, the circuitry 202 may be configured to process a raw 3D scan (not shown in FIG. 6) of the head portion of the object 110 to extract 3D points corresponding to a sclera of the one or more regions of the eye. For example, as shown in FIG. 6, 3D points 610A corresponding to the sclera of the eye may be extracted from the eye portion 610 of the raw 3D scan based on the processing of the raw 3D scan. The circuitry 202 may execute an eye part segmentation operation on each of the acquired set of images 602. Based on the executed eye part segmentation operation, the circuitry 202 may determine a set of regions in each of the acquired set of images 602 that may correspond to the sclera of the eye. Thereafter, the circuitry 202 may project the determined set of regions in each of the acquired set of images 602 to the raw 3D scan, to extract the 3D points corresponding to the sclera from the raw 3D scan. The projection of the determined set of regions may be based on the one or more camera parameters (associated with the set of image sensors 106). The extracted 3D points corresponding to the sclera may be associated with vertices of the raw 3D scan. The 3D feature points (or the 3D points) may not be labeled from the 3D mesh 326 (or the raw 3D scan) as an eye region of the 3D mesh 326 (or the raw 3D scan) may not be accurate. The eye region may have a reflection on the surface of the 3D mesh 326 (or the raw 3D scan). In addition, in the 3D mesh 326 (or the raw 3D scan), the eye region may be occluded due to the eyelids. The scenario 600 of FIG. 6 for the extraction of the 3D feature points and the extraction of the 3D points is for exemplary purposes and may not be used for limiting the scope of the disclosure.

Figure 7:
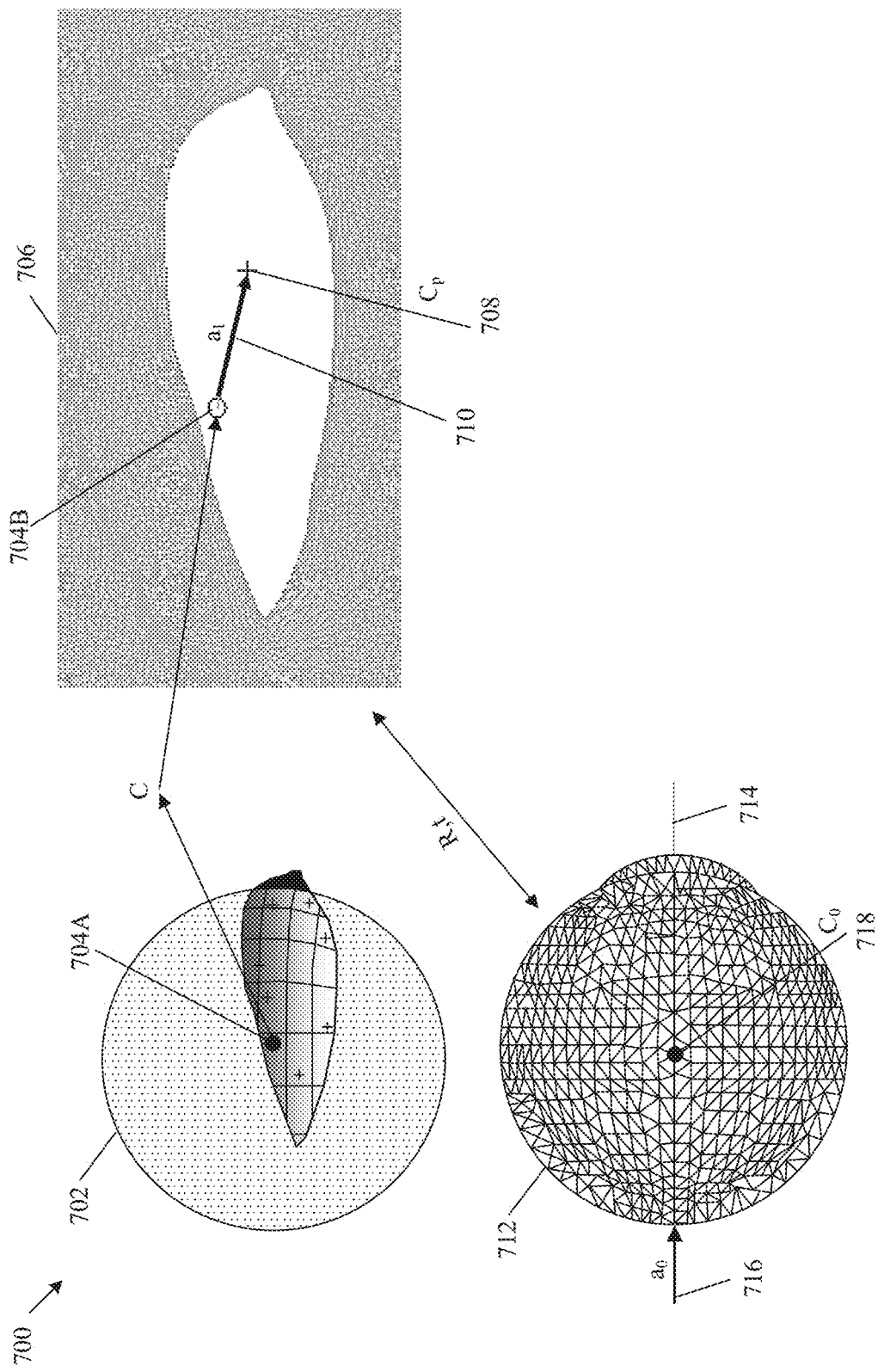
FIG. 7 is a diagram that illustrates an exemplary scenario for estimation of an initial pose transformation between a 3D template mesh of an eyeball and a sphere fitted to extracted 3D feature points, in accordance with an embodiment of the disclosure.

FIG. 7 is a diagram that illustrates an exemplary scenario for estimation of an initial pose transformation between a 3D template mesh of an eyeball and a sphere fitted to 3D feature points, in accordance with an embodiment of the disclosure. FIG. 7 is described in conjunction with elements from FIGS. 1, 2, 3A, 3B, 4, 5, and 6. With reference to FIG. 7, there is shown an exemplary scenario 700. The scenario 700 may include a sphere 702, an eye portion 706 of a 3D mesh (e.g., the 3D mesh 326), and a 3D template mesh 712. The scenario 700 may further include a first point 704A on the sphere 702, a second point 704B in the eye portion 706, a third point 708 in the eye portion 706, and a fourth point 718 on the 3D template mesh 712. The scenario 700 may further include a first vector 716, an axis of rotation 714 of the 3D template mesh 712, and a second vector 710.

The circuitry 202 may be configured to fit the sphere 702 to the extracted 3D feature points (for example, the first set of 3D feature points 608A associated with the contours of the eyelids). The sphere 702 may be fitted further to the extracted 3D points (for example, the 3D points 610A). The fitting of the sphere 702 is described further, for example, in FIG. 3A. The first point 704A may be the center of the sphere 702. The second point 704B may be a 3D location in the eye portion 706 of the 3D mesh 326 and may the correspond to the center of the sphere 702. The first point 704A and the second point 704B are denoted by "C". The third point 708 (which may be denoted by "$C_P$") may be the center of the pupil in the eye portion 706 of the 3D mesh 326. The third point 708 may be determined based on the extracted 3D feature points (for example, the second 3D feature point 608B associated with the center of the pupil). The fourth point 718 (which may be denoted by "$C_O$") may be the center of the 3D template mesh 712. The first vector 716 (denoted by "$a_0$") may be a vector along the axis of rotation 714 of the 3D template mesh 712. Further, the second vector 710 (denoted by "$a_1$") may be a vector that spans from the center (e.g., the second point 704B, denoted by "C") of the fitted sphere 702 to a 3D point (e.g., the third point 708, denoted by "$C_P$") that corresponds to a center of a pupil of the eye. The circuitry 202 may be configured to estimate a rotation parameter (denoted by "R") of an initial pose transformation, between the first vector 716 (denoted by "$a_0$") and the second vector 710 (denoted by "$a_1$"). By way of example, and not limitation, the rotation parameter may be estimated by use of equations (3), (4), (5), (6), and (7), which are given as follows:

$$v = a_0 \times a_1 \tag{3}$$

$$ss = \|v\| \tag{4}$$

$$c = a_0 \cdot a_1 \tag{5}$$

$$[v]_x \stackrel{def}{=} \begin{bmatrix} 0 & -v_3 & v_2 \\ v_3 & 0 & -v_1 \\ -v_2 & v_1 & 0 \end{bmatrix} \tag{6}$$

$$R = I + [v]_x + [v]_x^2 \frac{1-c}{ss^2} \tag{7}$$

where, v may represent a cross-product of the first vector 716 (denoted by "$a_0$") and the second vector 710 (denoted by "$a_1$");

ss may represent sine of an angle between the first vector 716 (denoted by "$a_0$") and the second vector 710 (denoted by "$a_1$");

c may represent cosine of an angle between the first vector 716 (denoted by "$a_0$") and the second vector 710 (denoted by "$a_1$");

$[v]_x$ may represent a skew-symmetric cross-product matrix of "v";

I may represent an identity matrix;

$$\frac{1-c}{ss^2}$$

may be simplified as $$\frac{1}{1+c};$$

and

R may represent a rotation matrix between the first vector 716 (denoted by "$a_0$") and the second vector 710 (denoted by "$a_1$").

In an embodiment, the circuitry 202 may be configured to estimate a translation parameter (denoted by "t") of the initial pose transformation based on an offset between the center (e.g., the second point 704B, denoted by "C") of the fitted sphere 702 and the center (e.g., the fourth point 718, denoted by "$C_0$") of the 3D template mesh 712. The translation parameter (denoted by "t") may be estimated by use of the following equation (8):

$$t = C - C_0 \tag{8}$$

The initial pose transformation between the 3D template mesh 712 and the fitted sphere 702 may be estimated based on the estimated rotation parameter (denoted by "R") and the estimated translation parameter (denoted by "t") of the initial pose transformation. The scenario 700 of FIG. 7 is for exemplary purpose and should not be construed as limiting the scope of the disclosure.

Figure 8:
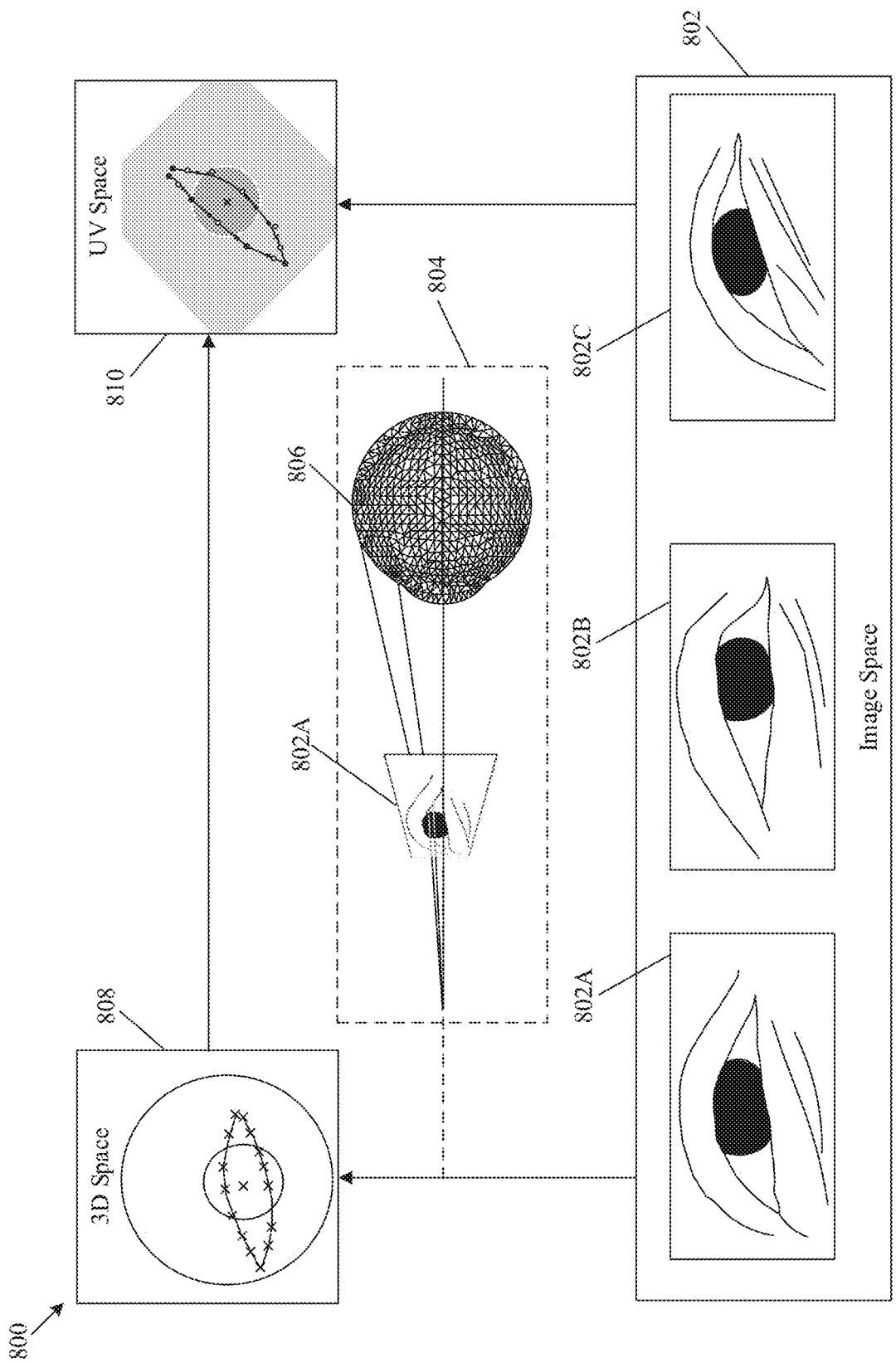
FIG. 8 is a diagram that illustrates an exemplary scenario for a first set of operations for interpolation of a first set of points that correspond to one or more regions of an eye, in accordance with an embodiment of the disclosure.

FIG. 8 is a diagram that illustrates an interpolation of a first set of points that correspond to one or more regions of an eye, in accordance with an embodiment of the disclosure. FIG. 8 is described in conjunction with elements from FIGS. 1, 2, 3A, 3B, 4, 5, 6, and 7. With reference to FIG. 8, there is shown an diagram 800 that illustrates a first set of operations for interpolation of a first set of points that correspond to one or more regions of an eye.

In the diagram 800, there is shown a set of images 802, which may include, for example, a first image 802A, a second image 802B, and a third image 802C in an image space. The diagram 800 depicts a first set of operations 804 and a 3D template mesh 806. The first set of operations 804 may be executed on an image (e.g., the first image 802A of the set of images 802) in the image space and the 3D template mesh 806. In the diagram, there is further shown a 3D space 808 corresponding to the image space associated with the set of images 802 and a UV space 810 corresponding to both the 3D space 808 and the image space.

The circuitry 202 may be configured to acquire the set of images 802 from the set of image sensors 106, as described, for example, in FIG. 3A. Thereafter, the circuitry 202 may be configured to label contours of one or more regions of the eye, including eyelids, a limbus, and a pupil in the acquired set of images 802. The contours of the one or more regions may be labeled based on a user input, an eye segmentation technique, or a combination of the eye segmentation technique and a user input. In an embodiment, to execute the first set of operations 804, the circuitry 202 may be configured to project one or more contours of the labeled contours to a 3D coordinate space (e.g., the 3D space 808), based on defined camera parameters of each of the set of image sensors 106. The camera parameters may include a first set of intrinsic camera parameters and a second set of extrinsic camera parameters.

To execute the first set of operations 804, the circuitry 202 may be configured to determine a set of contour points as intersecting points of the projection on the 3D template mesh 806. For example, as shown in FIG. 8, for the first image 802A, rays from a center of an image plane (associated with the image sensor) may be cast onto the 3D template mesh 806, such that the rays may pass through the one or more contours of the labeled contours in the first image 802A. The circuitry 202 may determine the set of contour points on the 3D template mesh 806 as points of intersection between the rays of the projection on the 3D template mesh 806. For example, the intersections of the projected rays and the pre-positioned eyeball (in the 3D template mesh 806) may be determined as the eyelid contour and the limbus contour on the 3D template mesh 806. The projection of one or more contours or points for the pupil is described further for example, in FIGS. 9A, 9B, 9C, and 9D. The execution of one or more operations (to interpolate the first set of points), including a first operation to unwrap the 3D template mesh 806 to a UV coordinate space (e.g., the UV space 810) and a second operation to apply one or more interpolation methods on the set of contour points, are described further, for example, in FIG. 10. The diagram 800 of FIG. 8 is for exemplary purpose and should not be construed as limiting the scope of the disclosure.

Figures 9A, 9B:
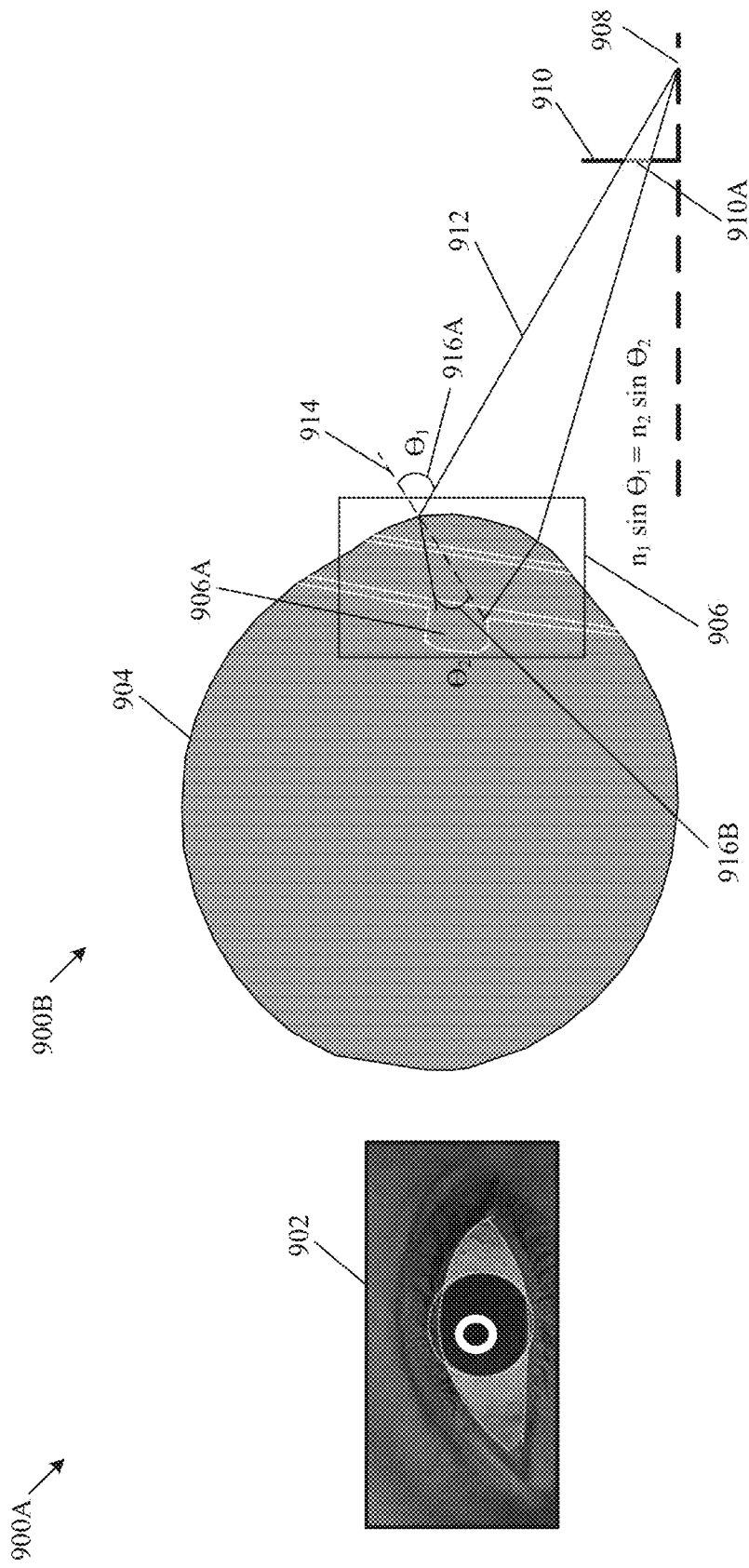

FIG. 9A is a diagram that illustrates an exemplary image of an eye including a pupil, in accordance with an embodiment of the disclosure. FIG. 9A is described in conjunction with elements from FIGS. 1, 2, 3A, 3B, 4, 5, 6, 7, and 8. With reference to FIG. 9A, there is shown a diagram 900A of an exemplary image 902 of an eye and a pupil 902A in the image 902. The pupil 902A is an anatomical structure that remains inside an outer eyeball structure of the eye. The size of the pupil 902A in the eye may vary based on ambient light conditions.

FIGS. 9B and 9C are diagrams that illustrate interpolation of a first set of points corresponding to the iris of an eye, in accordance with an embodiment of the disclosure. FIG. 9B is described in conjunction with elements from FIGS. 1, 2, 3A, 3B, 4, 5, 6, 7, 8, and 9A. With reference to FIG. 9B, there is shown a diagram 900B.

The diagram 900B includes a 3D template mesh 904 of an eyeball, an iris mesh component 906 of the 3D template mesh 904, a horizontal plane 908, and a vertical plane 910 perpendicular to the horizontal plane 908. The vertical plane 910 (which may also be referred as an imaging plane 910) may include an imaging slit 910A. As shown in the diagram 900B, a set of rays, including a first ray 912 may be cast from the imaging slit 910A to the 3D template mesh 904. The angle between the first ray 912 and a normal 914 at a point of an intersection of the first ray 912 and an outer surface of the 3D template mesh 904 may be referred to as a first angle 916A (denoted by $\theta_1$). The first ray 912 may be diffracted inside the 3D template mesh 904 due to a difference of refractive indices of air and the cornea of the eye. The angle between the diffracted ray and the normal 914 at the point of the intersection of the first ray 912 and the outer surface of the 3D template mesh 904 may be referred to as a second angle 916B (denoted by $\theta_2$).

The circuitry 202 may be configured to label one or more points 906A on the iris mesh component 906 of the 3D template mesh 904. The labeled one or more points 906A may correspond to a location of a pupil in the iris mesh component 906. In an embodiment, the one or more points 906A corresponding to the location of the pupil in the iris mesh component 906 may be labeled based on a user input.

The circuitry 202 may be configured to update positions of the labeled one or more points 906A, based on a refractive index of the cornea of the eye. The refractive index of the cornea of the eye may be determined based on equation (9), which is given as follows:

$$n_1 \sin \theta_1 = n_2 \sin \theta_2 \quad (9)$$

where,
- $n_1$ may represent incident index (e.g., a refractive index of air);
- $n_2$ may represent refracted index (e.g., a refractive index of the cornea of the eye);
- $\theta_1$ may represent an incident angle (e.g., the first angle 916A); and
- $\theta_2$ may represent a refracted angle (e.g., the second angle 916B).

The update of the positions of the labeled one or more points 906A may be further based on an intersection of a plane formed by the labeled one or more points 906A with rays cast from a reference position outside the 3D template mesh 904, as described further, for example, in FIG. 9C.

With reference to FIG. 9C, there is shown a diagram 900C. The diagram 900C may include the labeled one or more points 906A that may correspond to the location of the pupil in the iris mesh component 906 of the 3D template mesh 904. The diagram 900C may further include a plane 918 that may extend from the labeled one or more points 906A. The diagram 900C may include an expanded view 918A of the plane 918. The expanded view 918A may include intersection points 920 of rays (e.g., the first ray 912) that may be cast from a reference position 922 outside the 3D template mesh 904. The circuitry 202 may be configured to update of the positions of the labeled one or more points 906A further based on an intersection (at the intersection points 920) of the plane 918 formed by the labeled one or more points 906A with rays (e.g., the first ray 912) cast from the reference position 922 outside the 3D template mesh 904. Thus, the positions of the labeled one or more points 906A corresponding to the pupil (in the iris mesh component 906 of the 3D template mesh 904) may be updated based on the intersection points 920. In other words, the positions of the labeled one or more points 906A may be updated to the positions of the intersection points 920. An example of the updated positions of the labeled one or more points 906A is provided, for example, in FIG. 9D.

FIG. 9D is a diagram that illustrates update of positions of labeled one or more points corresponding to the pupil of the eye in an iris mesh component of a 3D template mesh, in accordance with an embodiment of the disclosure. FIG. 9D is described in conjunction with elements from FIGS. 1, 2, 3A, 3B, 4, 5, 6, 7, 8, 9A, 9B, and 9C. With reference to FIG. 9D, there is shown a diagram 900D. The diagram 900D may include a first 3D template mesh 924A and a second 3D template mesh 924B. The diagram 900D may further include first positions 926A of the labeled one or more points corresponding to the pupil of the eye and second positions 926B of the labeled one or more points corresponding to the pupil of the eye. The first positions 926A may lie in the first 3D template mesh 924A and the second positions 926B may lie in the in the second 3D template mesh 924B. The first 3D template mesh 924A may be same as the 3D template mesh 904 and the first positions 926A may be same as the positions of the labeled one or more points 906A corresponding to the pupil in the iris mesh component 906 of the 3D template mesh 904. The second 3D template mesh 924B may be an eye mesh that may be obtained from the first 3D template mesh 924A based on the update of the first positions 926A. The first positions 926A may be updated to the second positions 926B based on the positions of the intersection points 920, as described further, for example, in FIG. 9C. The diagrams 900A, 900B, 900C, and 900D of FIGS. 9A, 9B, 9C, and 9D, respectively, are for exemplary purpose and should not be construed as limiting the scope of the disclosure.

Figure 10:
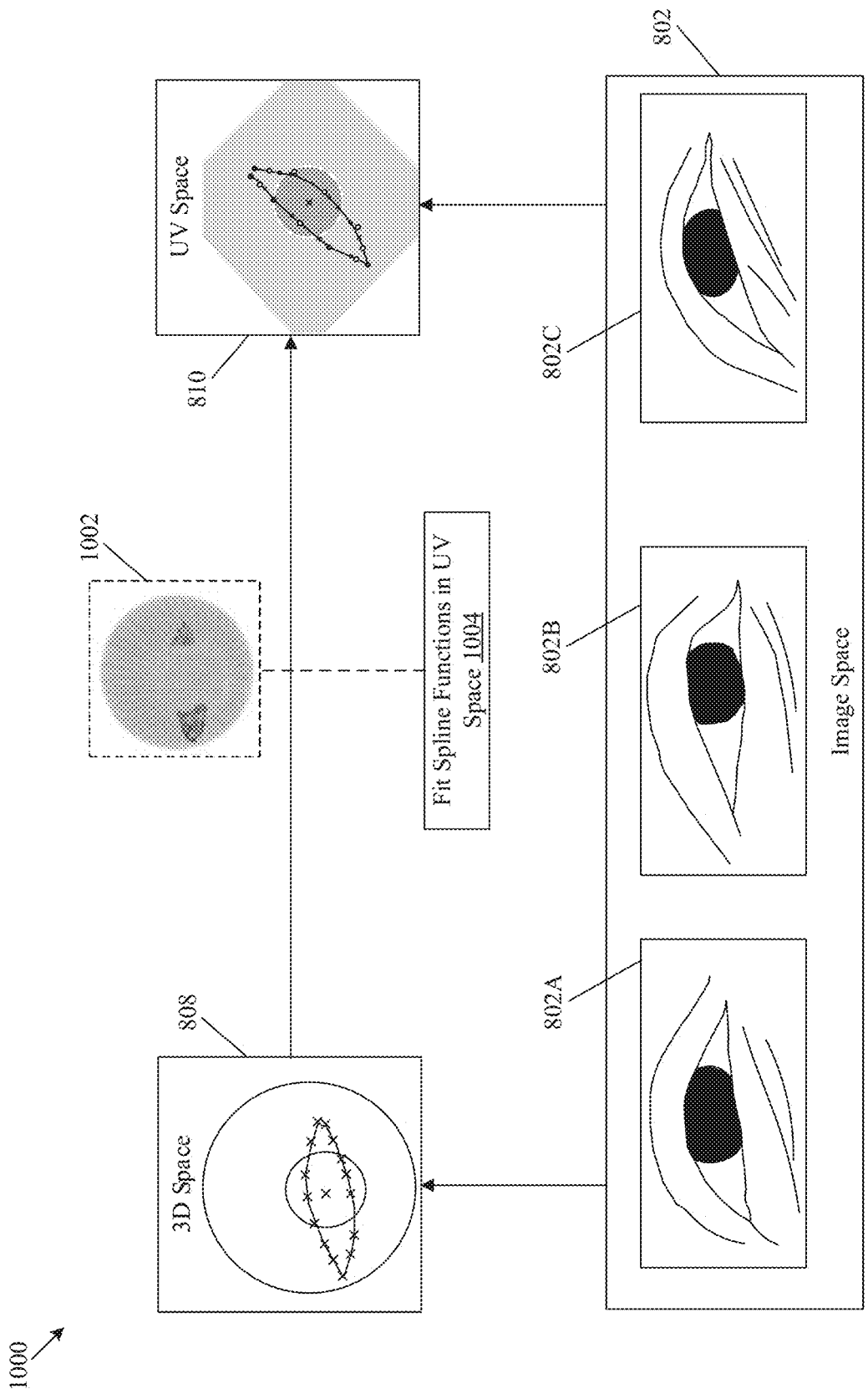
FIG. 10 is a diagram that illustrates an exemplary scenario for one or more operations for interpolation of a first set of points that correspond to one or more regions of an eye, in accordance with an embodiment of the disclosure.

FIG. 10 is a diagram that illustrates an exemplary scenario for interpolation of a first set of points that correspond to one or more regions of an eye, in accordance with an embodiment of the disclosure. FIG. 10 is described in conjunction with elements from FIGS. 1, 2, 3A, 3B, 4, 5, 6, 7, 8, 9A, 9B, 9C, and 9D. With reference to FIG. 10, there is shown an exemplary scenario 1000 for interpolation of a first set of points that correspond to one or more regions of an eye.

In the scenario 1000, there is shown the set of images 802, which includes, for example, the first image 802A, the second image 802B, and the third image 802C in the image space. The scenario 1000 may include the 3D space 808 corresponding to the image space associated with the set of images 802 and the UV space 810 corresponding to both the 3D space 808 and the image space. The scenario 1000 may further include an operation 1002 for determination of reference 3D points corresponding to the sclera on an 3D template mesh (e.g., the 3D template mesh 806). The scenario 1000 may further include an operation 1004 to fit spline functions in the UV space 810.

The circuitry 202 may be further configured to process the raw 3D scan of the head portion of the object 110 to extract the 3D points corresponding to the sclera of the one or more regions of the eye, as described, for example, in FIG. 6. To execute the operation 1002, the circuitry 202 may be configured to determine vertex positions corresponding to the sclera on the 3D template mesh 806 based on the extracted 3D points (e.g., the 3D points 610A). The circuitry 202 may be further configured to determine reference 3D points on the 3D template mesh 806 based on the determined vertex positions corresponding to the sclera on the 3D template mesh 806. For example, the reference 3D point corresponding to the sclera may be determined based on a Barycentric coordinate of a corresponding vertex position on a line that may connect the vertex position to the center of the eyeball. For each 3D reference point $V_r$ (that corresponds to the 3D point in the sclera region extracted from the raw 3D scan), the circuitry 202 may connect the extracted 3D point with the center of the eyeball template such that the connected line may intersect with a triangle of the eyeball template (e.g., a triangle with 3D coordinates $V_a$, $V_b$, $V_c$). The intersection may be represented as a Barycentric coordinate $V_i$, where $V_i = a*V_a + b*V_b + c*V_c$, where a, b, and c may be Barycentric coefficients. The reference 3D points may correspond to points which lie on the 3D template mesh 806 and are closest to the extracted 3D points.

In an embodiment, the execution of one or more operations to interpolate the first set of points may include a first operation to unwrap the 3D template mesh 806 to a UV coordinate space (e.g., the UV space 810) and a second operation to apply one or more interpolation methods on the set of contour points. The circuitry 202 may be configured to execute the first operation to unwrap the 3D template mesh 806 from the 3D space 808 to the UV space 810. The unwrapped 3D template mesh may include the determined set of contour points in the UV coordinate space, i.e., the UV space 810. The extracted 3D points (i.e., labeled points) for the eyelids and the limbus on the 3D template mesh 806 may be projected from the 3D space 808 to the UV space 810.

The circuitry 202 may be further configured to execute the second operation to apply the one or more interpolation methods on the set of contour points. To execute the second operation, the circuitry 202 may execute the operation 1004 to fit spline functions in the UV space 810. As part of the operation 1004, the circuitry 202 may be configured to fit spline curves into eyelid points of the set of contour points and fit a circle into limbus points of the set of contour points. In an embodiment, the fitting of the spline curves and the circle may be based on the initial pose transformation and a parameter for sampling points used in the one or more interpolation methods. The first set of points may correspond to points included in each of the fitted spline curves and the fitted circle.

For example, based on the extracted 3D feature points (e.g., the first set of 3D feature points 608A) of the eyelid, the circuitry 202 may fit a spline function (e.g., a function denoted by "Eyelid(.)") in the UV space 810. Parameters that may be used for the fitting of the spline function may include a pose parameter (denoted by ρ) of the eyeball and parameter values for sampling points (denoted by c) of the spline function. The pose parameter (denoted by ρ) may be a part of the initial pose transformation and may be known. Alternatively, in case of later iterations, the pose parameter may be a pose estimated from a previous iteration. The parameter values for the sampling points may be initialized as equidistantly positioned control points of the spline curve. s By way of example, and not limitation, the circuitry 202 may fit two fourth-order spline curves (i.e., a first spline curve to an upper eyelid contour and a second spline curve to a lower eyelid contour) with six control points, each to the contour of the upper and the lower eyelids in the UV space 810. The circuitry 202 may use equation (10), as follows, to fit the spline curves:

$$a_i^{lid} = \text{Camera}(\text{Eyeball}(\text{Eyelid}(c_i^{lid},\rho),\rho)) \quad (10)$$

where, $a_i^{lid}$ may represent 2D coordinates of the labeled contour points of the eyelid on the set of images 802;

$c_i^{lid}$ may represent the parameter values for sampling points for the eyelid;

ρ may represent the pose parameter (e.g., the initial pose transformation);

Eyelid(.) may represent a spline function for the eyelid contours;

Eyeball(.) may represent a function that may project the labeled points from UV space 810 to the 3D space 808; and Camera(.) may represent a function that may project points from the 3D space 808 to the image space (i.e., the 2D space).

The circuitry 202 may fit a first circle into the limbus points of the set of contour points by use of equation (11), which may be given as follows:

$$a_i^{lim} = \text{Camera}(\text{Eyeball}(\text{Limbus}(c_i^{lim}),\rho)) \quad (11)$$

where, $a_i^{lim}$ may represent 2D coordinates of the labeled contour points of the limbus on the set of images 802;

$c_i^{lim}$ may represent the parameter values for sampling points for the limbus;

ρ may represent the pose parameter (e.g., the initial pose transformation including the scale, the rotation, and the transformation parameters);

Limbus(.) may represent a function that may be a circle function for the limbus contour;

Eyeball(.) may represent a function that may project the labeled points from UV space 810 to the 3D space 808; and Camera(.) may represent a function that may project points from the 3D space 808 to the image space (i.e., the 2D space).

Based on the fitted first circle for the limbus, the circuitry 202 may estimate a radius (denoted by $r_{limbus}$) of the limbus and an angle ($\theta_{limbus}$) for each limbus point (corresponding to a labeled limbus point in the 3D space 808) in the UV space 810. Further, the circuitry 202 may fit a second circle for the pupil on the extended 3D plane (e.g., the plane 918). As described in FIG. 9C, the plane 918 may be formed by the labeled one or more points 906A with rays (e.g., the first ray 912) cast from the reference position 922 outside the 3D template mesh 904. Based on the fitted second circle for the pupil, the circuitry 202 may estimate a radius ($r_{pupil}$) of the pupil and an angle ($\theta_{pupil}$) for each labeled point of the pupil on an extended 3D plane (e.g., the plane 918) for the pupil. The first set of points may include at least points on the fitted two spline curves for the eyelid points, the fitted first circle for the limbus points, and the fitted second circle for the pupil points. Examples of labeled points of the set of contour points and the first set of points are provided, for example, in FIGS. 11A and 11B. The scenario 1000 of FIG. 10 is for exemplary purpose and should not be construed as limiting the scope of the disclosure.

Figure 11A:
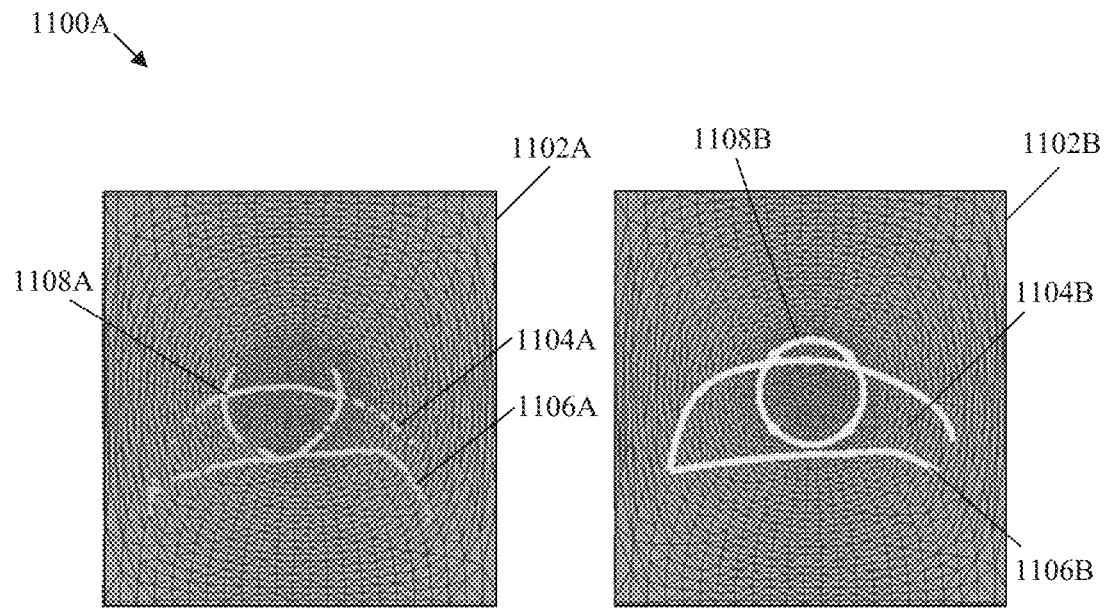
FIGS. 11A and 11B are diagrams that illustrate exemplary labeled points of a set of contour points of an eye and exemplary interpolated first set of points, in accordance with an embodiment of the disclosure.
Figure 11B:
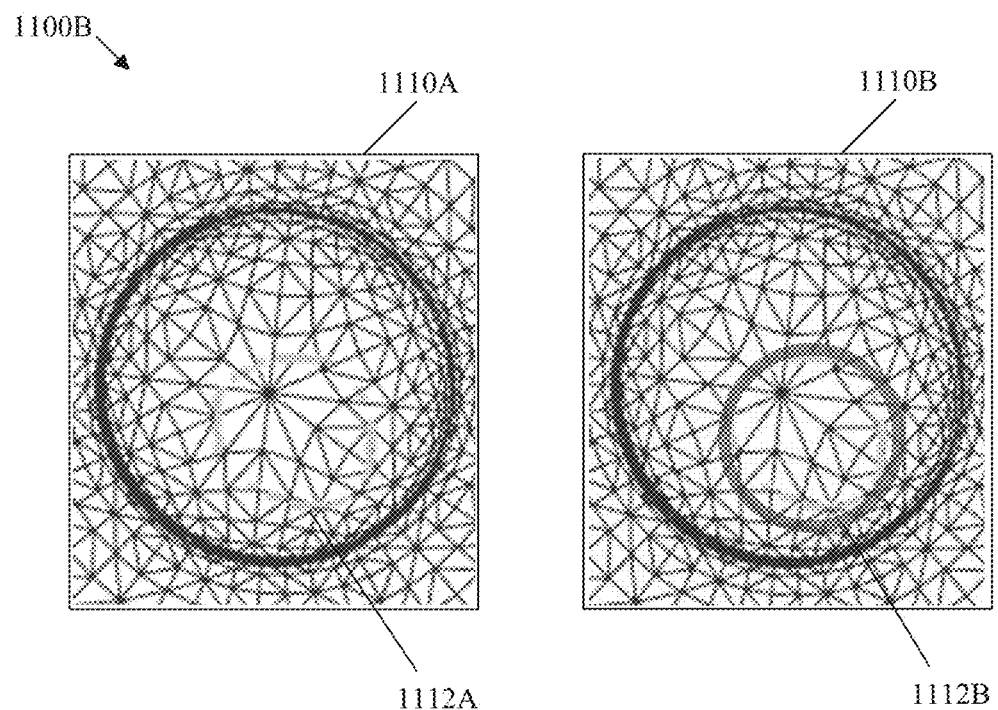

FIGS. 11A and 11B are diagrams that illustrate exemplary labeled points of a set of contour points of an eye and exemplary interpolated first set of points, in accordance with an embodiment of the disclosure. FIGS. 11A and 11B are described in conjunction with elements from FIGS. 1, 2, 3A, 3B, 4, 5, 6, 7, 8, 9A, 9B, 9C, 9D, and 10. With reference to FIG. 11A, there is shown a diagram 1100A which includes a first UV space 1102A and a second UV space 1102B. The first UV space 1102A may include a first set of contour points 1104A associated with upper eyelids of an eye and a second set of contour points 1106A associated with lower eyelids of the eye. The first UV space 1102A may further include a third set of contour points 1108A associated with a limbus of the eye. The first set of contour points 1104A, the second set of contour points 1106A, and the third set of contour points 1108A may be contour points, selected based on the labeled contours of the one or more regions of the eye. The contour points may lie on the 3D template mesh 806 that may be unwrapped from the 3D space 808 to the UV space 810.

The second UV space 1102B may include a first set of contour points 1104B associated with upper eyelids of the eye and a second set of contour points 1106B associated with lower eyelids of the eye. The second UV space 1102B may further include a third set of contour points 1108B associated with a limbus of the eye. The first set of contour points 1104B may correspond to the first spline curve that may be fitted to the contour points of the upper eyelids of the eye, and the second set of contour points 1106B may correspond to the second spline curve that may be fitted to the contour points of the lower eyelids of the eye. The third set of contour points 1108B may correspond to the first circle fitted to the contour points of the limbus of the eye. The interpolated first set of points in the second UV space 1102B (for example, the UV space 810) may include the first set of contour points 1104B, the second set of contour points 1106B, and the third set of contour points 1108B.

With reference to FIG. 11B, there is shown a diagram 1100B that includes a first 3D space 1110A and a second 3D space 1110B. The first 3D space 1110A may include a first set of contour points 1112A associated with a pupil of the eye and the second 3D space 1110B may include a second set of contour points 1112B associated with the pupil of the eye. The first set of contour points 1112A may correspond to the labeled one or more points corresponding to a location of the pupil in the iris mesh component 906. The second set of contour points 1112B may correspond to the second circle fitted to the contour points of the pupil of the eye. The interpolated first set of points in the second 3D space 1110B (for example, the 3D space 808) may include the second set of contour points 1112B. The diagrams 1100A and 1100B of FIGS. 11A and 11B are for exemplary purpose and may not be used for limiting the scope of the disclosure.

Figure 12:
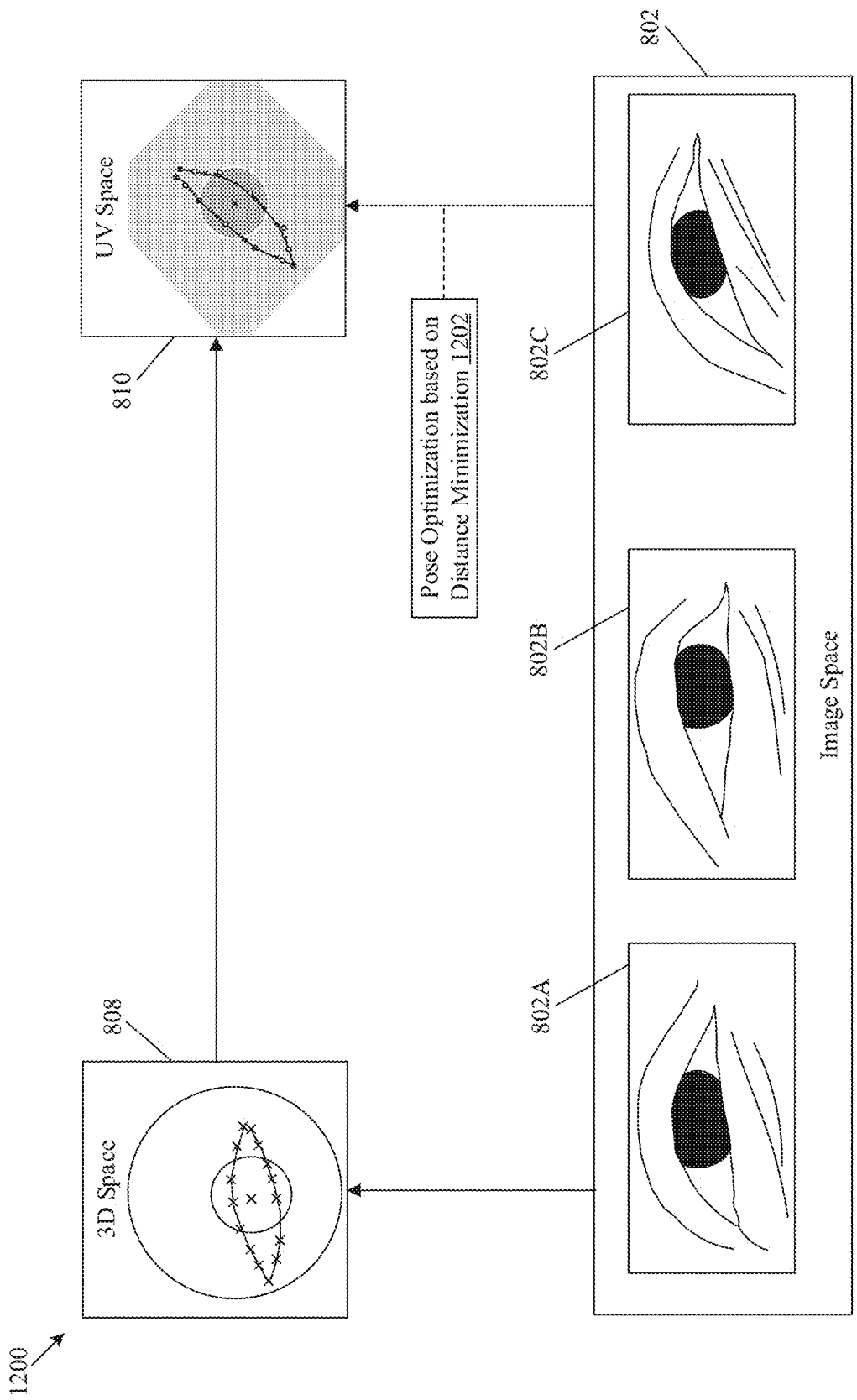
FIG. 12 is a diagram that illustrates an exemplary scenario for determination of final pose transformation, in accordance with an embodiment of the disclosure.

FIG. 12 is a diagram that illustrates an exemplary scenario for determination of final pose transformation, in accordance with an embodiment of the disclosure. FIG. 12 is described in conjunction with elements from FIGS. 1, 2, 3A, 3B, 4, 5, 6, 7, 8, 9A, 9B, 9C, 9D, 10, 11A, and 11B. With reference to FIG. 12, there is shown an exemplary scenario 1200 for one or more operations for determination of a final pose transformation for a 3D template mesh (for example, the 3D template mesh 806).

In the scenario 1200, there is shown the set of images 802, which includes, for example, the first image 802A, the second image 802B, and the third image 802C in the image space. The scenario 1200 may include the 3D space 808 corresponding to the image space associated with the set of images 802 and the UV space 810 corresponding to both the 3D space 808 and the image space. The scenario 1200 may further include an operation 1202 for pose optimization based on distance minimization.

In an embodiment, the circuitry 202 may be configured to determine a second set of points, which may correspond to the one or more regions of the eye, based on sampling parameters associated with the interpolated first set of points. For example, sampling parameters, such as, the various control points (i.e., "c") of the two curves fitted for the eyelids, may be varied to determine the second set of points corresponding to the eyelids. Further, the fitted first circle for the limbus may be shifted towards a center of the UV space 810 to determine the second set of points corresponding to the limbus. In addition, the fitted second circle for the pupil may be shifted towards a center of the extended 3D plane (e.g., the plane 918) to determine the second set of points corresponding to the pupil.

To execute the operation 1202 for pose optimization based on distance minimization, the circuitry 202 may be configured to determine a final pose transformation based on a minimization of a difference between the first set of points and the second set of points. The difference may be specified in terms of a distance measure in the 3D space 808 to be estimated between the reference 3D points and the extracted 3D points associated with the sclera, and a distance measure in the 3D space 808 between the first set of points and the second set of points associated with the pupil. Also, the difference may be specified in terms of a distance measure in the UV space 810 between the first set of points and the second set of points associated with the eyelids and a distance measure in the UV space 810 between the first set of points and the second set of points associated with the limbus. In an embodiment, the determination of the final pose transformation may be an iterative process in which the initial pose transformation (such as the pose parameter, ρ) may be iteratively updated till distance measure is minimum. The determination of the reference 3D points is described further, for example, in FIG. 10 and the extraction of the 3D points is described further, for example, in FIG. 6.

In an embodiment, the circuitry 202 may determine the final pose transformation by use of equations (12), (13), (14), (15), (16), (17), (18), and (19), which may be given as follows:

$$E_{annotation}(P) = E_{limbus} + E_{eyelid} + E_{scan} + E_{pupil} \tag{12}$$

$$x_i^{lim} = \text{Camera}(\text{Eyeball}(\text{Limbus}(c_i^{lim}), \rho)) \tag{13}$$

$$E_{limbus} = w_{limbus} \cdot \frac{1}{n^{lim}} \cdot \sum_{i=1}^{n^{lim}} \|x_i^{lim} - a_i^{lim}\|^2 \tag{14}$$

$$x_i^{lid} = \text{Camera}(\text{Eyeball}(\text{Eyelid}(c_i^{lid}, \rho), \rho)) \tag{15}$$

$$E_{eyelid} = w_{eyelid} \cdot \frac{1}{n^{lid}} \cdot \sum_{i=1}^{n^{lid}} \|x_i^{lid} - a_i^{lid}\|^2 \tag{16}$$

$$E_{scan} = w_{scan} \cdot \frac{1}{n^{ref}} \cdot \sum_{i=1}^{n^{ref}} \|x_i^{scl} - p_i^{scl}\|^2 \tag{17}$$

$$r_i^{pup} = (\text{Refract}(\text{cam}^{-1}(a_i^{pup}), \text{Eyeball}(\rho)) \tag{18}$$

$$E_{pupil} = w_{pupil} \cdot \frac{1}{n^{pup}} \cdot \sum_{i=1}^{pup} \|x_i^{pup}(\rho, r, \theta) - r_i^{pup}\|^2 \tag{19}$$

where, $E_{annotation}(P)$ may represent an objective function associated with a pose of an eye that may be optimized by minimization for the determination of the final pose transformation;

$E_{limbus}$ may represent an energy term for the limbus of the eye;

$E_{eyelid}$ may represent an energy term for the eyelids of the eye;

$E_{scan}$ may represent an energy term for the sclera of the eye;

$E_{pupil}$ may represent an energy term for the pupil of the eye;

$w_{limbus}$ may represent a weight associated with the energy term (i.e., $E_{limbus}$) for the limbus of the eye;

$w_{eyelid}$ may represent a weight associated with the energy term (i.e., $E_{eyelid}$) for the eyelids of the eye;

$w_{scan}$ may represent a weight associated with the energy term (i.e., $E_{scan}$) for the sclera of the eye;

$w_{pupil}$ may represent a weight associated with the energy term (i.e., $E_{pupil}$) for the pupil of the eye;

$n^{lim}$ may represent a number of points (i.e., the first set of points or the second set of points) associated with the limbus in the UV space 810;

$n^{lid}$ may represent a number of contour points (i.e., the first set of points or the second set of points) associated with the eyelid in the UV space 810;

$n^{ref}$ may represent a number of the reference 3D points (or the extracted 3D points) corresponding to the sclera in the 3D space 808;

$n^{pup}$ may represent a number of points (i.e., the first set of points or the second set of points) associated with the pupil in the 3D space 808;

$x_i^{lim}$ may represent the second set of points interpolated for the limbus;

$a_i^{lim}$ may represent 2D coordinates of the labeled contour points of the limbus on the set of images 802;

$c_i^{lim}$ may represent the parameter values for the sampling points for the limbus;

$\rho$ may represent the pose parameter (e.g., the initial pose transformation including the scale, the rotation, and the transformation parameters);

Limbus(.) may represent a function that may a circle function for the limbus contour;

Eyeball(.) may represent a function that may project the labeled points from UV space 810 to the 3D space 808; and Camera(.) may represent a function that may project points from the 3D space 808 to the image space (i.e., the 2D space)

$x_i^{lid}$ may represent the second set of points interpolated for the eyelid;

$a_i^{lid}$ may represent 2D coordinates of the labeled contour points of the eyelid on the set of images 802;

$c_i^{lid}$ may represent the parameter values for sampling points for the eyelid;

Eyelid(.) may represent a spline function for the eyelid contours;

$x_i^{scl}$ may represent coordinates of the extracted 3D points corresponding to the sclera in the 3D space 808;

$p_i^{scl}$ may represent coordinates of the reference 3D points corresponding to the sclera in the 3D space 808;

$r_i^{pup}$ may represent 2D coordinates of a radius of the pupil;

$a_i^{pup}$ may represent 2D coordinates of the labeled one or more points of the pupil;

$\text{cam}^{-1}$(.) may represent an inverse Camera(.) function that may project points from the image space (i.e., the 2D space) to the 3D space 808;

Refract(.) may represent a function that may model refraction of incident rays of the pupil at the cornea of the eye; and $X_i^{pup}(\rho, r_{pupil}, \theta_{pupil})$ may represent triangulated 3D position for the pupil (represented by polar coordinates $(r_{pupil}, \theta_{pupil})$), which may be moved towards the center of the extended 3D plane (e.g., the plane 918).

In an embodiment, the circuitry 202 may optimize (i.e., minimize) the energy term $E_{limbus}$ (for the limbus of the eye) and the energy term $E_{eyelid}$ (for the eyelids of the eye) in the 2D space (for example, in the UV space 810). Further, the circuitry 202 may optimize (i.e., minimize) the energy term $E_{scan}$ (for the sclera of the eye) and the energy term $E_{pupil}$ (for the pupil of the eye) in the 3D space 808. The optimization may be executed iteratively such that the interpolated second set of points (e.g., $x_i^{lim}$, $x_i^{lid}$, $p_i^{scl}$, and $X_i^{pup}(\rho, r_{pupil}, \theta_{pupil})$) associated with the one or more regions of the eye of a previous iteration may be used to initialize the first set of points for the next iteration and interpolate the second set of points for the next iteration. For example, in each iteration, the pose $\rho$ may be known from initialization or the previous iteration. The first set of points may be the labeled 2D points (for example, for eyelids and limbus) or 3D points (for example, for sclera and pupil) and may be fixed. Spline and circle fitting may be used to interpolate the labeled 2D points in the UV space 810. Once the second set of points is determined, the objective function may be minimized to estimate the pose $\rho$. The process may be repeated with the next iteration. The optimization may continue until a target value for the objective function (i.e., $E_{annotation}(P)$) may be achieved or until the objective function cannot be minimized further. The final value of the pose determined at the end of the optimization may correspond to the final pose transformation. In an embodiment, the circuitry 202 may be configured to fit the 3D template mesh 806 into an eyeball socket of the 3D mesh 326, based on the determined final pose transformation, as described, for example, in FIG. 3B. In an embodiment, the circuitry 202 may be further configured to apply, around an eyelid contour of the 3D mesh 326, an as-rigid-as-possible (ARAP) deformation over the 3D mesh 326, to obtain a refined 3D mesh, as described further, for example, in FIG. 13. The scenario 1200 of FIG. 12 is for exemplary purpose and should not be construed as limiting the scope of the disclosure.

Figure 13:
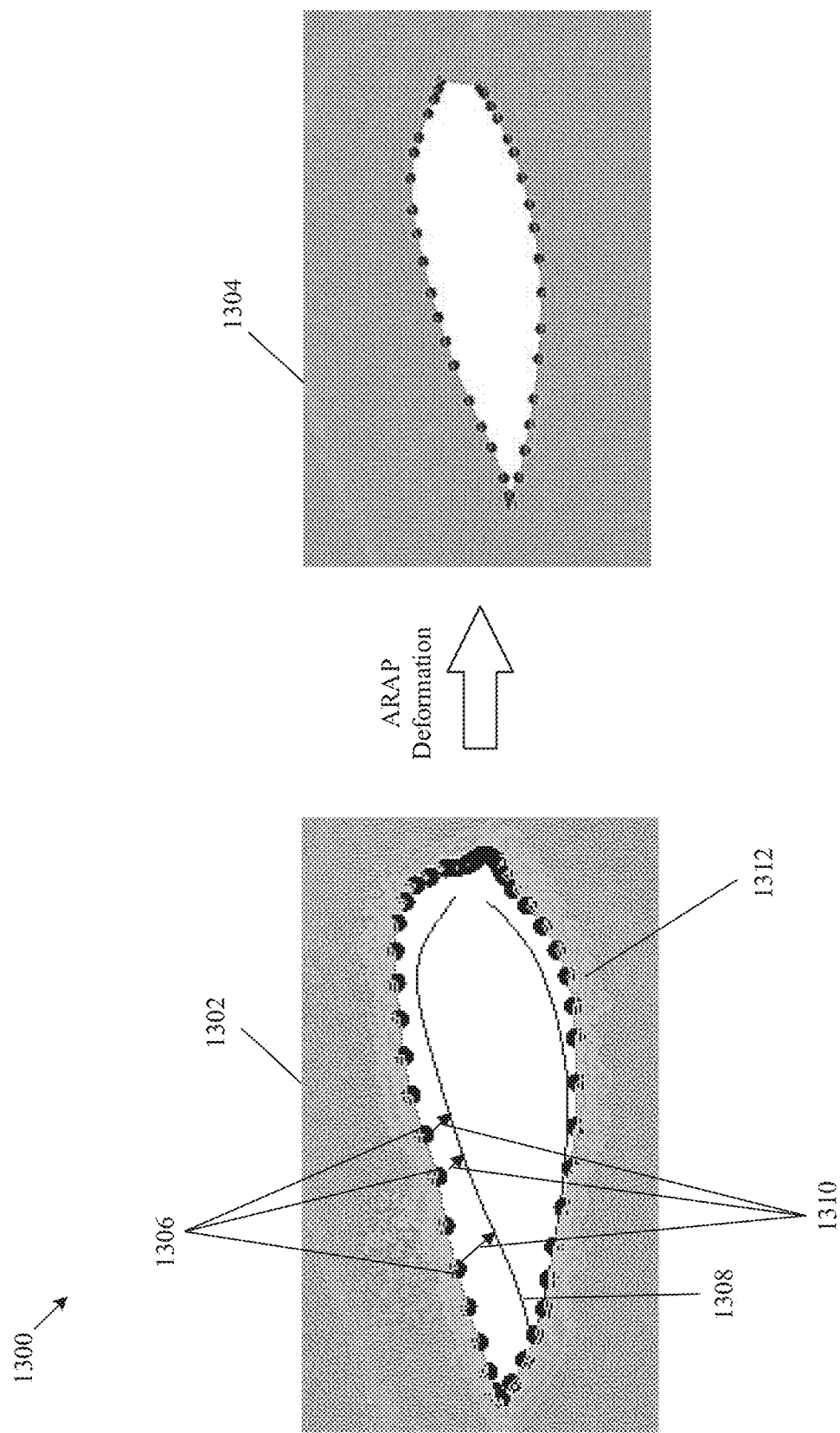
FIG. 13 is a diagram that illustrates an exemplary scenario to obtain a refined 3D mesh, in accordance with an embodiment of the disclosure.

FIG. 13 is a diagram that illustrates an exemplary scenario to obtain a refined 3D mesh, in accordance with an embodiment of the disclosure. FIG. 13 is described in conjunction with elements from FIGS. 1, 2, 3A, 3B, 4, 5, 6, 7, 8, 9A, 9B, 9C, 9D, 10, 11A, 11B, and 12. With reference to FIG. 13, there is shown an exemplary scenario 1300. The scenario 1300 may include an eye portion 1302 of the 3D mesh 326, an eye portion 1304 of a refined 3D mesh, a set of vertices 1306 corresponding to eyelid contours in the eye portion 1302, a set of target positions 1308 corresponding to the set of vertices 1306, a set of deformation vectors 1310, and a deformation region 1312 in the eye portion 1302.

After the final pose transformation (as described in FIG. 12) for the 3D template mesh 806 is determined, the 3D mesh 326 may have to be refined to remove gaps or holes between the boundary vertices of the 3D template mesh 806 of the eyeball and surrounding mesh vertices of the eyeball socket. Thus, the circuitry 202 may refine vertex positions where the eyelids touch the eyeball in the 3D mesh 326 for a smooth and seamless fitting of the 3D template mesh 806 in the eyeball socket. Such refinement of the 3D mesh 326 may be based on the estimated final pose of the eyeball and the fitted 3D curve of the eyelid contours.

The circuitry 202 may be configured to apply an as-rigid-as-possible (ARAP) deformation over the 3D mesh 326 to obtain the refined 3D mesh. The ARAP deformation may be applied around an eyelid contour (including the set of vertices 1306) of the 3D mesh 326 to obtain the refined 3D mesh (as shown in the eye portion 1304, in FIG. 13). The ARAP deformation may be applied based on a position of the eyelid contour (including the set of vertices 1306) and the final pose transformation (which may be associated with the set of deformation vectors 1310). For example, based on the set of deformation vectors 1310, the set of vertices 1306 corresponding to the eyelid contours in the eye portion 1302 may be updated to the set of target positions 1308 corresponding to the set of vertices 1306. Further, based on the update of the set of vertices 1306, the deformation region 1312 may be deformed. In an embodiment, the circuitry 202 may be configured to fit the 3D template mesh 328 into the eyeball socket of the refined 3D mesh. The scenario 1300 of FIG. 13 is for exemplary purpose and may not be used for limiting the scope of the disclosure.

Figure 14:
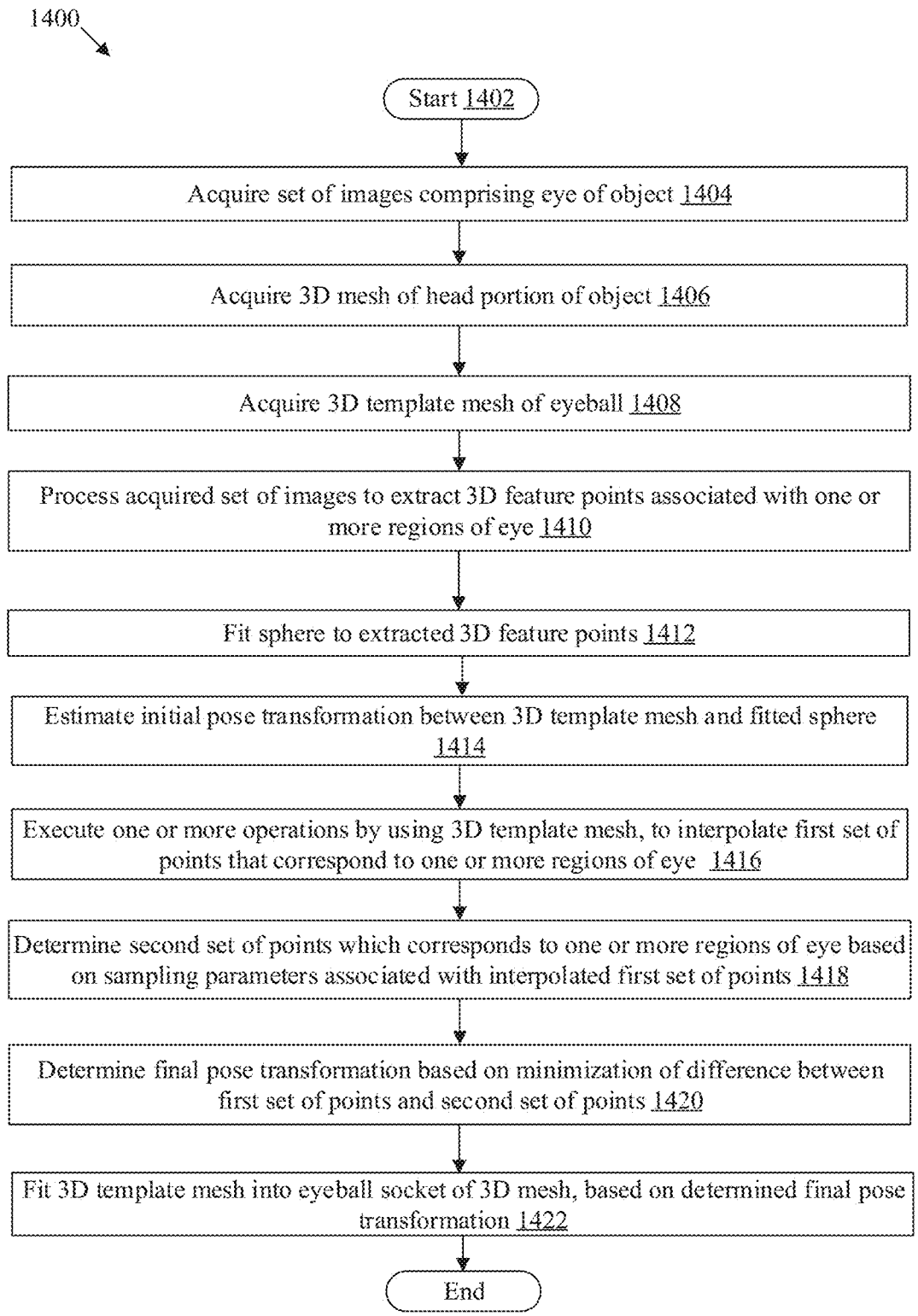
FIG. 14 is a flowchart that illustrates exemplary operations for eyeball positioning for 3D head modeling, in accordance with an embodiment of the disclosure.

FIG. 14 is a flowchart that illustrates exemplary operations for eyeball positioning for 3D head modeling, in accordance with an embodiment of the disclosure. FIG. 14 is described in conjunction with elements from FIGS. 1, 2, 3A, 3B, 4, 5, 6, 7, 8, 9A, 9B, 9C, 9D, 10, 11A, 11B, 12, and 13. With reference to FIG. 14, there is shown a flowchart 1400. The flowchart 1400 may include operations from 1404 to 1422 and may be implemented on the electronic device 102. The flowchart 1400 may start at 1402 and proceed to 1404.

At 1404, the set of images comprising the eye of the object 110 may be acquired. In an embodiment, the circuitry 202 may be configured to acquire the set of images (e.g., the first image 324A, the second image 324B, and the third image 324C). The set of images may include the eye of the object 110. The set of image sensors 106 may capture the set of images and transmit the captured set of images to the electronic device 102. The circuitry 202 may acquire the captured set of images from the set of image sensors 106. The acquisition of the set of images is described further, for example, in FIG. 3A.

At 1406, the 3D mesh 326 of the head portion of the object 110 may be acquired. In an embodiment, the circuitry 202 may be configured to acquire the 3D mesh 326 of the head portion of the object 110. In an embodiment, the 3D mesh 326 may be acquired from the server 104. The acquisition of the 3D mesh is described further, for example, in FIG. 3A.

At 1408, the 3D template mesh of the eyeball may be acquired. In an embodiment, the circuitry 202 may be configured to acquire the 3D template mesh (e.g., a 3D template mesh 328) of the eyeball of an object, such as, the object 110 (for example, a human subject, or an animal, or a statue/portrait of a human subject or an animal). The acquisition of the 3D template mesh is described further, for example, in FIG. 3A.

At 1410, the acquired set of images may be processed to extract the 3D feature points associated with the one or more regions of the eye. In an embodiment, the circuitry 202 may be configured to process the acquired set of images to extract the 3D feature points. The 3D feature points may be associated with one or more regions of the eye. Examples of the one or more regions of the eye may include, but are not limited to, eyelids, a limbus, a sclera, a pupil, and an iris. In an embodiment, the circuitry 202 may be configured to identify the set of 2D feature points of the eye in each of the acquired set of images (e.g., the first image 324A, the second image 324B, and the third image 324C). Further, the circuitry 202 may determine a 3D position of each of the set of 2D feature points, based on a set of camera parameters associated with one or more image-capture devices (e.g., the set of image sensors 106) that captured the set of images. Herein, the 3D features points may be extracted based on the determined 3D position. In an embodiment, the identification of the set of 2D feature points may be based on one or more of, but not limited to, a user input, an eyelid detection technique, or an eye part segmentation technique. Further, the set of 2D feature points may include contour points along eyelids of the eye and a point at a center of a pupil of the eye. For example, a first set of 3D feature points 330A associated with the contours of the eyelids and a second 3D feature point 330B associated with the center of the pupil may be extracted based on the processing of the acquired set of images. The first set of 3D feature points 330A and the second 3D feature point 330B are shown in an eye portion 330 of the 3D mesh (e.g., the 3D mesh 326). In an embodiment, the circuitry 202 may be configured to process a raw 3D scan (not shown in FIG. 3A) of the head portion of the object 110 to extract 3D points corresponding to a sclera of the one or more regions of the eye. For example, in FIG. 3A, there are shown, 3D points 332A corresponding to the sclera in an eye portion 332 of the raw 3D scan. The extraction of the 3D feature points and the 3D points are described further, for example, in FIG. 6.

At 1412, the sphere 334 may be fit to the extracted 3D feature points. In an embodiment, the circuitry 202 may be configured to fit the sphere 334 to the extracted 3D feature points (for example, a set of 3D feature points 334A, as shown in FIG. 3A). The fitting of the sphere to the extracted 3D feature points is described further, for example, in FIG. 3A.

At 1414, the initial pose transformation between the 3D template mesh 328 and the fitted sphere 334 may be estimated. In an embodiment, the circuitry 202 may be configured to estimate the initial pose transformation between the 3D template mesh 328 and the fitted sphere 334. To estimate the initial pose transformation, the scale factor, the rotation parameter, and the translation parameter of the initial pose transformation may be estimated. The estimation of the initial pose transformation is described further, for example, in FIG. 3B.

At 1416, the one or more operations may be executed by using the 3D template mesh 328, to interpolate the first set of points that may correspond to the one or more regions of the eye. In an embodiment, the circuitry 202 may be configured to execute the one or more operations by using the 3D template mesh 328, to interpolate the first set of points that may correspond to the one or more regions of the eye. Examples of the one or more regions of the eye may include, but are not limited to, eyelids, a limbus, a sclera, a pupil, and an iris. The execution of the one or more operations is described further, for example, in FIG. 3B.

At 1418, the second set of points may be determined, based on the sampling parameters associated with the interpolated first set of points. The determined second set of points may correspond to the one or more regions of the eye. In an embodiment, the circuitry 202 may be configured to determine the second set of points, based on sampling parameters associated with the interpolated first set of points. The determination of the second set of points is described further, for example, in FIG. 12.

At 1420, the final pose transformation may be determined based on the minimization of the difference between the first set of points and the second set of points. In an embodiment, the circuitry 202 may be configured to determine the final pose transformation, based on the minimization of the difference between the first set of points and the second set of points. In an embodiment, the determination of the final pose transformation may be further based on the minimization of the distance between the reference 3D points and the extracted 3D points. The difference may be specified in terms of a distance measure in the 3D space 808 to be estimated between the reference 3D points and the extracted 3D points associated with the sclera, and also a distance measure in the 3D space 808 between the first set of points and the second set of points associated with the pupil. The difference may also be in terms of a distance measure in the UV space 810 between the first set of points and the second set of points associated with the eyelids, and also a distance measure in the UV space 810 between the first set of points and the second set of points associated with the limbus. The determination of the final pose transformation is described further, for example, in FIG. 12.

At 1422, the 3D template mesh 328 may be fit into the eyeball socket of the 3D mesh 326 based on the determined final pose transformation. In an embodiment, the 3D mesh 326 may include an empty eyeball socket to represent an eyeball in the head portion of the object 110. The circuitry 202 may be configured to fit the 3D template mesh 328 into the eyeball socket of the 3D mesh 326, based on the determined final pose transformation and the estimated scale factor (i.e., "s"), as described further at 310. In other words, based on the estimated scale factor, the 3D template mesh 328 may be scaled to a size that may represent a life-size human eye. The scaled 3D template mesh 328 may then be fitted into the eyeball socket of the 3D mesh 326. The eyeball may be accurately positioned in the 3D template mesh 328, based on the determined final pose transformation, as described, for example, at operations described at 308 to 318. When the 3D template mesh 328 with the accurately positioned eyeball may be properly scaled (based on the scale factor) and fit into the eyeball socket of the 3D mesh 326, the eyeball may impart photorealism to the 3D mesh 326. Control may pass to the end.

Although the flowchart 1400 is illustrated as discrete operations, such as 1404, 1406, 1408, 1410, 1412, 1414, 1416, 1418, 1420, and 1422, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate an electronic device (for example, the electronic device 102). The instructions may cause the electronic device 102 to perform operations that include acquiring a set of images (e.g., the images 324A, 324B, and 324C) comprising an eye of an object (e.g., the object 110). The operations may further include acquiring a three-dimensional (3D) mesh (e.g., the 3D mesh 326) of a head portion of the object 110. The operations may further include acquiring a 3D template mesh (e.g., the 3D template mesh 328) of an eyeball. The operations may further include processing the acquired set of images to extract 3D feature points (e.g., the first set of 3D feature points 330A associated with the contours of the eyelids and the second 3D feature point 330B associated with the center of the pupil) associated with one or more regions of the eye. The operations may further include fitting a sphere (e.g., the sphere 334) to the extracted 3D feature points. The operations may further include estimating an initial pose transformation between the 3D template mesh 328 and the fitted sphere 334. The operations may further include executing one or more operations by using the 3D template mesh 328, to interpolate a first set of points that correspond to the one or more regions of the eye. The operations may further include determining a second set of points which may correspond to the one or more regions of the eye based on sampling parameters associated with the interpolated first set of points. The operations may further include determining a final pose transformation based on a minimization of a difference between the first set of points and the second set of points. The operations may further include fitting the 3D template mesh 328 into an eyeball socket of the 3D mesh 326, based on the determined final pose transformation.

Exemplary aspects of the disclosure may provide an electronic device (such as, the electronic device 102 of FIG. 1) that includes circuitry (such as, the circuitry 202). The circuitry 202 may be configured to acquire a set of images (e.g., the images 324A, 324B, and 324C) of an eye of an object (e.g., the object 110). The circuitry 202 may be further configured to acquire a three-dimensional (3D) mesh (e.g., the 3D mesh 326) of a head portion of the object 110. The circuitry 202 may be further configured to acquire a 3D template mesh (e.g., the 3D template mesh 328) of an eyeball. The circuitry 202 may be further configured to process the acquired set of images to extract 3D feature points (e.g., the first set of 3D feature points 330A associated with the contours of the eyelids and the second 3D feature point 330B associated with the center of the pupil) associated with one or more regions of the eye. The circuitry 202 may be further configured to fit a sphere (e.g., the sphere 334) to the extracted 3D feature points. The circuitry 202 may be further configured to estimate an initial pose transformation between the 3D template mesh 328 and the fitted sphere 334. The circuitry 202 may be further configured to execute one or more operations by using the 3D template mesh 328, to interpolate a first set of points that correspond to the one or more regions of the eye. The circuitry 202 may be further configured to determine a second set of points which may correspond to the one or more regions of the eye based on sampling parameters associated with the interpolated first set of points. The circuitry 202 may be further configured to determine a final pose transformation based on a minimization of a difference between the first set of points and the second set of points. The circuitry 202 may be further configured to fit the 3D template mesh 328 into an eyeball socket of the 3D mesh 326, based on the determined final pose transformation.

In an embodiment, the one or more regions of the eye comprise of eyelids, a limbus, a sclera, a pupil, and an iris.

In an embodiment, the circuitry 202 may be further configured to identify a set of two-dimensional (2D) feature points of the eye in each of the acquired set of images. The circuitry 202 may be further configured to determine a 3D position of each of the set of 2D feature points, based on a set of camera parameters associated with one or more image-capture devices that captured the set of images. The 3D features points may be extracted based on the determined 3D position. The identification of the set of 2D feature points may be based on one or more of a user input, an eyelid detection technique, or an eye part segmentation technique, and the set of 2D feature points include contour points along eyelids of the eye and a point at a center of a pupil of the eye.

In an embodiment, the circuitry 202 may be further configured to process a raw 3D scan of the head portion of the object to extract 3D points corresponding to a sclera of the one or more regions of the eye. The circuitry 202 may be further configured to fit the sphere 334 further to the extracted 3D points.

In an embodiment, the circuitry 202 may be further configured to estimate a scale factor that may correspond to a ratio of a radius of the fitted sphere 334 to a radius of the 3D template mesh 328. The 3D template mesh 328 may be fitted into the eyeball socket further based on the estimated scale factor.

In an embodiment, the circuitry 202 may be further configured to estimate a rotation parameter of the initial pose transformation between a first vector along an axis of rotation of the 3D template mesh 328 and a second vector that spans from a center of the fitted sphere 334 to a 3D point that corresponds to a center of a pupil of the eye. The circuitry 202 may be further configured to estimate a translation parameter of the initial pose transformation based on an offset between the center of the fitted sphere 334 and the center of the 3D template mesh 328.

In an embodiment, the circuitry 202 may be further configured to label contours of the one or more regions including eyelids, a limbus, and a pupil in the acquired set of images. The circuitry 202 may be further configured to project one or more contours of the labelled contours to a 3D coordinate space, based on defined camera parameters. The circuitry 202 may be further configured to determine a set of contour points as intersecting points of the projection on the 3D template mesh 328. The execution of the one or more operations may comprise of a first operation to unwrap the 3D template mesh 328 to a UV coordinate space. The unwrapped 3D template mesh may include the determined set of contour points in the UV coordinate space. The execution of the one or more operations may further comprise of a second operation to apply one or more interpolation methods to fit spline curves into eyelid points of the set of contour points, and fit a circle into limbus points of the set of contour points. In an embodiment, the fitting of the spline curves and the circle may be based on the initial pose transformation and a parameter for sampling points used in the one or more interpolation methods. In an embodiment, the first set of points corresponds to points included in each of the fitted spline curves and the fitted circle.

In an embodiment, the circuitry 202 may be further configured to label one or more points on an iris mesh component of the 3D template mesh 328. The labeled one or more points may correspond to a location of a pupil in the iris mesh component. In an embodiment, the circuitry 202 may be further configured to update positions of the labelled one or more points, based on a refractive index of a cornea of the eye and an intersection of a plane formed by the labelled one or more points with rays cast from a reference position outside the 3D template mesh 328. The first set of points may include the updated positions of the labelled one or more points.

In an embodiment, the circuitry 202 may be further configured to process a raw 3D scan of the head portion of the object to extract 3D points corresponding to a sclera of the one or more regions of the eye. The circuitry 202 may be further configured to determine vertex positions corresponding to the sclera on the 3D template mesh 328 based on the extracted 3D points. The circuitry 202 may be further configured to determine reference 3D points on the 3D template mesh 328 based on the determined vertex positions corresponding to the sclera on the 3D template mesh 328. The final pose transformation may be determined further based on a minimization of a distance between the reference 3D points and the extracted 3D points.

In an embodiment, the circuitry 202 may be further configured to apply, around an eyelid contour of the 3D mesh 326, an as-rigid-as-possible (ARAP) deformation over the 3D mesh 326, to obtain a refined 3D mesh. The ARAP deformation may be applied based on a position of the eyelid contour and the final pose transformation. Further, the 3D template mesh is fitted into the eyeball socket of the refined 3D mesh.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
circuitry configured to:
acquire a set of images comprising an eye of an object;
acquire a three-dimensional (3D) mesh of a head portion of the object;
acquire a 3D template mesh of an eyeball;
process the acquired set of images to extract 3D feature points associated with a plurality of regions of the eye;
fit a sphere to the extracted 3D feature points;
estimate an initial pose transformation between the 3D template mesh and the fitted sphere, wherein
the initial pose transformation includes estimation of a scale factor that corresponds to a ratio of a radius of the fitted sphere and a radius of the 3D template mesh, and
the scale factor represents a factor to scale and match a size of the 3D template mesh to a size of an eyeball socket of the 3D mesh of the object;
execute one or more operations by using the 3D template mesh, to interpolate a first set of points that correspond to the plurality of regions of the eye;
determine a second set of points which corresponds to the plurality of regions of the eye based on sampling parameters associated with the interpolated first set of points;
determine a final pose transformation based on a minimization of a difference between the first set of points and the second set of points; and fit the 3D template mesh into the eyeball socket of the 3D mesh, based on the determined final pose transformation and the estimated scale factor.

2. The electronic device according to claim 1, wherein the plurality of regions of the eye comprises of eyelids, a limbus, a sclera, a pupil, and an iris.

3. The electronic device according to claim 1, wherein the circuitry is further configured to:
identify a set of two-dimensional (2D) feature points of the eye in each of the acquired set of images; and
determine a 3D position of each of the set of 2D feature points, based on a set of camera parameters associated with one or more image-capture devices that captured the set of images,
wherein the 3D features points are extracted based on the determined 3D position.

4. The electronic device according to claim 3, wherein the identification of the set of 2D feature points is based on one or more of a user input, an eyelid detection technique, or an eye part segmentation technique, and the set of 2D feature points include contour points along eyelids of the eye and a point at a center of a pupil of the eye.

5. The electronic device according to claim 1, wherein the circuitry is further configured to:
process a raw 3D scan of the head portion of the object to extract 3D points corresponding to a sclera of the plurality of regions of the eye; and
fit the sphere further to the extracted 3D points.

6. The electronic device according to claim 1, wherein the circuitry is further configured to:
label one or more points on an iris mesh component of the 3D template mesh, wherein the labeled one or more points correspond to a location of a pupil in the iris mesh component; and
update positions of the labelled one or more points, based on a refractive index of a cornea of the eye and an intersection of a plane formed by the labelled one or more points with rays cast from a reference position outside the 3D template mesh,
wherein the first set of points includes the updated positions of the labelled one or more points.

7. The electronic device according to claim 1, wherein the circuitry is further configured to:
estimate a rotation parameter of the initial pose transformation between a first vector along an axis of rotation of the 3D template mesh and a second vector that spans from a center of the fitted sphere to a 3D point that corresponds to a center of a pupil of the eye; and
estimate a translation parameter of the initial pose transformation based on an offset between the center of the fitted sphere and the center of the 3D template mesh.

8. The electronic device according to claim 1, wherein the circuitry is further configured to:
label contours of the plurality of regions including eyelids, a limbus, and a pupil in the acquired set of images;
project one or more contours of the labelled contours to a 3D coordinate space, based on defined camera parameters; and
determine a set of contour points as intersecting points of the projection on the 3D template mesh.

9. The electronic device according to claim 8, wherein the execution of the one or more operations comprises of:
a first operation to unwrap the 3D template mesh to a UV coordinate space, wherein the unwrapped 3D template mesh includes the determined set of contour points in the UV coordinate space, and a second operation to apply one or more interpolation methods to:
fit spline curves into eyelid points of the set of contour points; and
fit a circle into limbus points of the set of contour points.

10. The electronic device according to claim 9, wherein the fitting of the spline curves and the circle is based on the initial pose transformation and a parameter for sampling points used in the one or more interpolation methods.

11. The electronic device according to claim 9, wherein the first set of points corresponds to points included in each of the fitted spline curves and the fitted circle.

12. The electronic device according to claim 1, wherein the circuitry is further configured to apply, around an eyelid contour of the 3D mesh, an as-rigid-as-possible (ARAP) deformation over the 3D mesh, to obtain a refined 3D mesh,
wherein the ARAP deformation is applied based on a position of the eyelid contour and the final pose transformation, and
the 3D template mesh is fitted into the eyeball socket of the refined 3D mesh.

13. The electronic device according to claim 1, wherein the circuitry is further configured to:
process a raw 3D scan of the head portion of the object to extract 3D points corresponding to a sclera of the plurality of regions of the eye;
determine vertex positions corresponding to the sclera on the 3D template mesh based on the extracted 3D points; and
determine reference 3D points on the 3D template mesh based on the determined vertex positions corresponding to the sclera on the 3D template mesh.

14. The electronic device according to claim 13, wherein the final pose transformation is determined further based on a minimization of a distance between the reference 3D points and the extracted 3D points.

15. A non-transitory computer-readable medium having stored thereon, computer-executable instructions that when executed by circuitry of an electronic device, causes the electronic device to execute operations, the operations comprising:
acquiring a set of images comprising an eye of an object;
acquiring a three-dimensional (3D) mesh of a head portion of the object;
acquiring a 3D template mesh of an eyeball;
processing the acquired set of images to extract 3D feature points associated with a plurality of regions of the eye;
fitting a sphere to the extracted 3D feature points;
estimating an initial pose transformation between the 3D template mesh and the fitted sphere, wherein
the initial pose transformation includes estimation of a scale factor that corresponds to a ratio of a radius of the fitted sphere and a radius of the 3D template mesh, and
the scale factor represents a factor to scale and match a size of the 3D template mesh to a size of an eyeball socket of the 3D mesh of the object;
executing one or more operations by using the 3D template mesh, to interpolate a first set of points that correspond to the plurality of regions of the eye;
determining a second set of points which corresponds to the plurality of regions of the eye based on sampling parameters associated with the interpolated first set of points;

determining a final pose transformation based on a minimization of a difference between the first set of points and the second set of points; and fitting the 3D template mesh into the eyeball socket of the 3D mesh, based on the determined final pose transformation and the estimated scale factor.

16. A method, comprising:

in an electronic device:

acquiring a set of images comprising an eye of an object;

acquiring a three-dimensional (3D) mesh of a head portion of the object;

acquiring a 3D template mesh of an eyeball;

processing the acquired set of images to extract 3D feature points associated with a plurality of regions of the eye;

fitting a sphere to the extracted 3D feature points;

estimating an initial pose transformation between the 3D template mesh and the fitted sphere, wherein the initial pose transformation includes estimation of a scale factor that corresponds to a ratio of a radius of the fitted sphere and a radius of the 3D template mesh, and the scale factor represents a factor to scale and match a size of the 3D template mesh to a size of an eyeball socket of the 3D mesh of the object;

executing one or more operations by using the 3D template mesh, to interpolate a first set of points that correspond to the plurality of regions of the eye;

determining a second set of points which corresponds to the plurality of regions of the eye based on sampling parameters associated with the interpolated first set of points;

determining a final pose transformation based on a minimization of a difference between the first set of points and the second set of points; and fitting the 3D template mesh into the eyeball socket of the 3D mesh, based on the determined final pose transformation and the estimated scale factor.

17. The method according to claim 16, further comprising:

labelling contours of the plurality of regions including eyelids, a limbus, and a pupil in the acquired set of images;

projecting one or more contours of the labelled contours to a 3D coordinate space, based on defined camera parameters; and determining a set of contour points as intersecting points of the projection on the 3D template mesh.

18. The method according to claim 17, wherein the execution comprises:

unwrapping the 3D template mesh to a UV coordinate space, wherein the unwrapped 3D template mesh includes the determined set of contour points in the UV coordinate space; and applying one or more interpolation methods to:

fit spline curves into eyelid points of the set of contour points; and fit a circle into limbus points of the set of contour points.

19. The method according to claim 18, wherein the fitting of the spline curves and the circle is based on the initial pose transformation and a parameter for sampling points used in the one or more interpolation methods, and the first set of points corresponds to points included in each of the fitted spline curves and the fitted circle.

* * * * *